United States Patent [19]

Hosotani et al.

[11] Patent Number: 5,009,562

[45] Date of Patent: Apr. 23, 1991

[54] CONTROL FOR LOAD CARRIER OF LIFT TRUCK

[75] Inventors: Takashi Hosotani, Kawasaki; Kiyoshi Inoue, Tokyo, both of Japan

[73] Assignee: Nissan Motor Co., Ltd., Yokohama, Japan

[21] Appl. No.: 137,292

[22] Filed: Dec. 23, 1987

[30] Foreign Application Priority Data

| | | | |
|---|---|---|---|
| Dec. 23, 1986 | [JP] | Japan | 61-306800 |
| Apr. 20, 1987 | [JP] | Japan | 62-96930 |
| Apr. 20, 1987 | [JP] | Japan | 62-96931 |
| Apr. 20, 1987 | [JP] | Japan | 62-96932 |
| Apr. 24, 1987 | [JP] | Japan | 62-101629 |

[51] Int. Cl.[5] .................................................. B60P 1/00

[52] U.S. Cl. ...................................... 414/440; 414/661

[58] Field of Search ............... 414/661, 437, 439, 441, 414/440, 497, 280; 180/53.6, 53.61; 91/458

[56] References Cited

U.S. PATENT DOCUMENTS

| | | | |
|---|---|---|---|
| 2,531,560 | 11/1950 | De Wall | 414/439 |
| 2,709,531 | 5/1955 | Mercier et al. | 414/497 X |
| 2,965,254 | 12/1960 | Bowles | 414/497 X |
| 2,973,876 | 3/1961 | Voss | 414/497 X |
| 3,110,148 | 11/1963 | Mader et al. | 414/437 X |
| 3,493,138 | 2/1970 | Schafer | 214/674 |
| 4,284,384 | 8/1981 | Olson | 414/497 X |
| 4,297,070 | 10/1981 | Didtel | 414/661 X |
| 4,359,127 | 11/1982 | Arnold | 180/252 |
| 4,708,575 | 11/1987 | Farmer et al. | 414/497 X |

FOREIGN PATENT DOCUMENTS

| | | |
|---|---|---|
| 57-195098 | 11/1982 | Japan . |
| 58-4591 | 1/1983 | Japan . |
| 58-4600 | 1/1983 | Japan . |
| 58-123894 | 8/1983 | Japan . |
| 58-123895 | 8/1983 | Japan . |
| 58-123897 | 8/1983 | Japan . |
| WO86/03173 | 6/1986 | World Int. Prop. O. . |

OTHER PUBLICATIONS

Orbitroll brochure (Japanese language).

"Casecade Load Push Pull & Loan Push", Casecade Manual No. 135-05; pp. 2 and 3.

Load Push-Pull Operation Manual by Nissan Motor Co., Ltd.

*Primary Examiner*—D. Glynn Dayoan

*Attorney, Agent, or Firm*—Foley & Lardner

[57] ABSTRACT

A lift truck comprises a roller rotatable at a rate substantially proportional to a ground vehicle speed and a hydraulic regulator operated by the roller to discharge hydraulic fluid at a rate substantially proportional to the ground vehicle speed. An actuator for a push-pull mechanism with a face plate is operated on the hydraulic fluid generated by the hydraulic regulator so that the face plate can displace in synchronized with the ground vehicle speed.

13 Claims, 21 Drawing Sheets

CONTROL FOR LOAD CARRIER OF LIFT TRUCK

BACKGROUND OF THE INVENTION

The present invention relates to an industrial vehicle such as a lift vehicle and more particularly to a vehicle speed responsive load carrier of a lift vehicle.

A vehicle speed responsive load carrier is known which comprises a push-pull mechanism with a face plate. The push-pull mechanism includes a hydraulic actuator which, under the control of a control unit, displaces the face plate longitudinally in response to a ground speed of the vehicle.

One such load carrier is disclosed in JP-A 57-195098. In this known device, there are provided two sensors, one for measuring a velocity at which the face plate displaces relative to the vehicle body, the other for measuring a ground velocity at which the vehicle displaces, and an electro-hydraulic module is disposed in a hydraulic circuit to regulate fluid supply to the hydraulic actuator in response to the output signals of the sensors. The sensors and electro-hydraulic module are expensive. The whole system is composed of an electronic control part and a hydraulic control part which have different response speeds to external disturbances so that it is difficult to suppress occurrence of hunting and overshooting phenomena.

One object of the present invention is to provide a vehicle speed responsive load carrier which is not provided with such a complicated electro-hydraulic module as used in the prior art as mentioned above.

SUMMARY OF THE PRESENT INVENTION

According to the present invention, a load carrier for a vehicle comprises a hydraulic fluid discharge unit for generating a hydraulic fluid at a rate substantially proportional to a ground speed of the vehicle, and a hydraulic actuator operated on the hydraulic fluid.

In one form of the present invention, a load carrier comprises a hydraulic regulator that is operated by a roller rotating at a rate substantially proportional to a ground velocity which the vehicle displaces and a hydraulic actuator operated on the hydraulic fluid generated by the hydraulic regulator. Thus, the hydraulic fluid generated by the hydraulic regulator is substantially proportional to the ground speed since it is operated by the roller.

Specifically, the roller is in rolling contact with the ground so that it rotates as the vehicle displaces relative to the ground. Alternatively, the roller may be in rolling contact with a tire for a vehicle wheel or it may be driven by a transmission component, e.g., a transmission output shaft, that is considered to rotate at a rate substantially proportional to the vehicle ground speed, or it may be driven by a vehicle road wheel.

In another form of the present invention, in order to prevent the supply of hydraulic fluid from the hydraulic regulator to the hydraulic actuator when not needed, a valve is provided which opens a bypass fluid path.

In still another form of the present invention, in order to prevent the supply of hydraulic fluid from the hydraulic regulator to the hydraulic actuator, a clutch is provided to interrupt the driving connection between the roller and the hydraulic regulator.

In further form of the present invention, the hydraulic regulator is connected to the hydraulic actuator by hydraulic fluid lines and a fluid inflow device and/or a fluid outflow device are provided to effect correction of a ratio of displacement of the hydraulic actuator to a unit volume of hydraulic fluid supplied to the actuator by the hydraulic regulator.

In still further form of the present invention, the hydraulic actuator is in the form of a cylinder having a piston with a single rod extending through one of two cylinder chambers defined by the piston, and a valve is provided which reduces supply of hydraulic fluid to the one cylinder chamber upon receiving hydraulic fluid from the hydraulic regulator to bring a speed at which the face plate displaces in one direction into agreement with a speed at which the face plate displaces in the opposite direction when the other cylinder chamber is supplied with hydraulic fluid at the same flow rate.

Specifically, the load carrier comprises a push-pull mechanism including a face plate with a gripper adapted to grip a slip sheet under a load to be carried by the load carrier. The face plate is arranged above platens or forks of the vehicle and displaceable in a longitudinal direction of the vehicle in a push direction, as viewed from an operator behind the face plate, when the push-pull mechanism is extended or in a pull direction when the push pull mechanism is retracted. In inserting the platens or forks under a slip sheet lying under a load, with the push-pull mechanism extended to set the face plate near the load, the manual lever is set to a "pull" side. Then, hydraulic fluid is supplied to a push-pull sequence circuit. With this push-pull sequence circuit, firstly, the gripper is hydraulically operated to firmly grip the slip sheet and subsequently, the hydraulic fluid is allowed to be supplied to a hydraulic actuator of the push-pull mechanism to cause the push-pull mechanism to retract or pull the face plate as the vehicle body advances toward the load. Subsequently, in removing the platens from under the load, firstly the gripper is set into another operation to release the slip sheet and then the hydraulic actuator of the push-pull mechanism is actuated to push the face plate as the vehicle moves away from the load to remove the platens from under the load. According to the present invention, during an automatic mode, when a manipulator, such as a lever or a switch, is manipulated, a first hydraulic fluid is supplied to the sequence circuit to cause the gripper to operate and a further supply of the first hydraulic fluid to the sequence circuit is prevented upon detection of the completion of the operation of the gripper, and a second hydraulic fluid discharged by a hydraulic regulator operated by a roller rotating at a rate substantially proportional to a ground velocity of the vehicle, causing the hydraulic actuator of the push pull mechanism to operate on this second hydraulic fluid. Thus, the intended operation of the gripper is ensured before the vehicle's operator starts moving the vehicle since the supply of first hydraulic fluid to the sequence circuit terminates upon completion of the intended operation of the gripper.

In order to ensure the sequence of operation, the sequence circuit includes means for restricting fluid flow to the hydraulic actuator of the push pull mechanism to cause the hydraulic actuator to initiate its operation upon completion of the operation of the gripper.

For ease of layout of fluid lines within a limited space, a manual mode hydraulic fluid line system for conveying the first hydraulic fluid and an automatic mode hydraulic fluid line system for conveying the second hydraulic fluid lines become merged before leading to the sequence circuit. According to one feature of the present invention, two hydraulic fluid line systems are made independent in such a manner that entry of the first hydraulic fluid to the automatic mode hydraulic fluid line system is prevented.

According to another feature of the present invention, the hydraulic regulator is in the form of a device well known as "an orbitroll (trademark)" which has two outlet port connections and is so constructed and arranged as to discharge oil out of one of the two outlet port connections at a rate substantially proportional to an input angle in one rotational direction and to discharge oil out of the other outlet port at a rate substantially proportional to an input angle in the opposite rotational direction. oil. Even though supply of hydraulic fluid to the orbitroll is interrupted when synchronized operation of the push-pull mechanism with the vehicle ground speed is not needed, the orbitroll performs a so-called hand pumping operation to discharge hydraulic fluid out of the appropriate one of the outlet port connections. According to a specific feature of the present invention, an electromagnetic bypass valve is provided between the fluid lines connected to the two outlet port connections of the orbitroll. Alternatively, an electromagnetic clutch is provided to interrupt driving connection between the roller and the orbitroll. Alternatively, the orbitroll is modified such that it will not perform the so-called hand pumping operation.

BRIEF DESCRIPSTION OF THE DRAWINGS

DETAILED DESCRIPTION OF THE INVENTION

The present invention is further described referring to various embodiments illustrated in the accompanying drawings.

Figure 1:
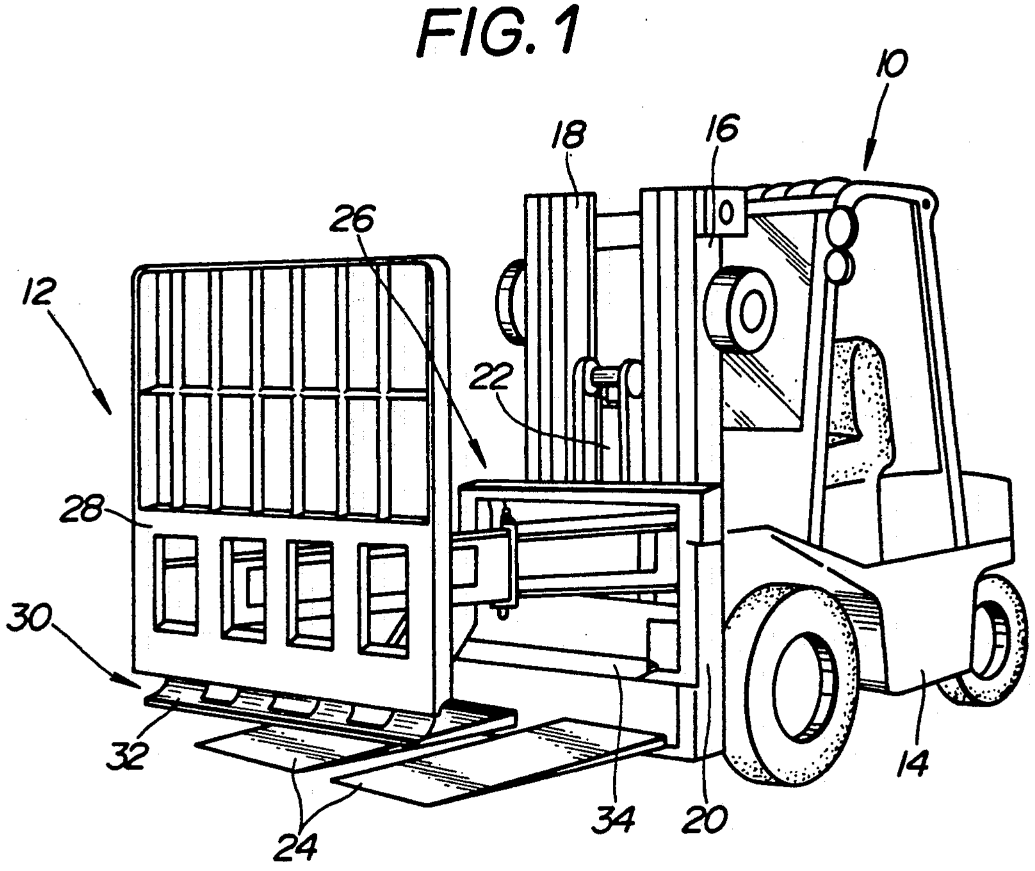
FIG. 1 is a perspective view of a push-pull mechanism mounted above platens of a lift truck.

Referring to FIG. 1, a lift truck 10 is shown. This lift truck 10 is provided with a push-pull mechanism 12 and well known as a load push-pull type lift truck. The lift truck 10 comprises a vehicle body 14 and a pair of tiltable masts 16, 18. A rail 20 is secured to a lift bracket, not illustrated, which is liftable along the masts 16, 18 by a lift cylinder 22. A pair of platens 24 are mounted to the rail 20 for lateral movement. Also mounted in the same manner to the rail 20 is an extendable and contractable linkage in the form of a pantagraph 26. The pantagraph 26 has one end securely attached to the rail 20 and an opposite end securely holding a face plate 28. The face plate 28 has a gripper 30 which includes a gripper jaw 32 disposed under the face plate 28 and adapted to grip a slip sheet lying under a load. Also included by the gripper 30 is a gripper cylinder, not illustrated, which is operative to open or close the gripper jaw 32. Designated by the reference numeral 34 is a sheet retainer adapted for recovery of a slip sheet used to lie under a load. The retainer 34 includes a retainer cylinder, not illustrated.

Figure 2:
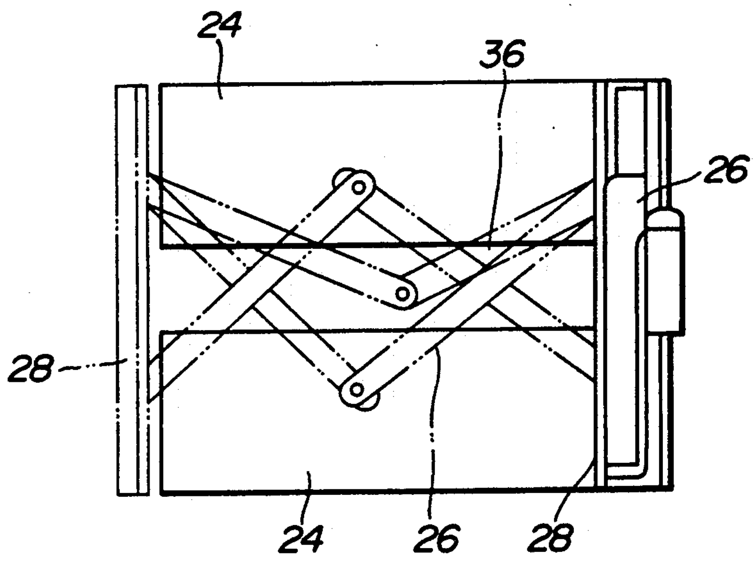
FIG. 2 is a diagrammatic plan view of the push-pull mechanism.

Referring to FIG. 2, there is shown in fully drawn line the pantagraph 26 in a fully folded state and the face plate 28, thus, assumes a retracted position. The phantom line shows the pantagraph 26 in fully extended state and the face plate 28, thus, assumes a most extended position. A displacement of the face plate 28 from the retracted position to the extended position, namely, a displacement in a push direction as viewed from an operator of the truck, and a displacement of the face plate 28 from the extended position to the retracted position, namely, a displacement in a pull direction, are effected by a hydraulic actuator in the form of a cylinder called hereinafter as a push-pull cylinder 36.

Figure 3:
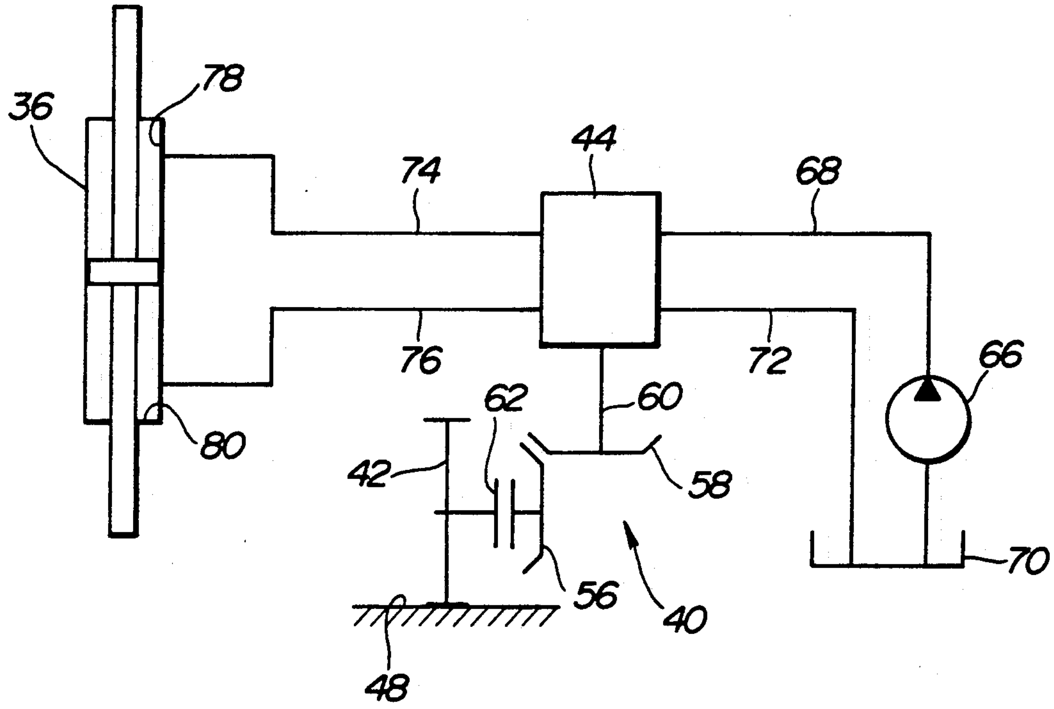
FIG. 3 is a diagram illustrating a first embodiment of a control system according to the present invention.
Figure 4:
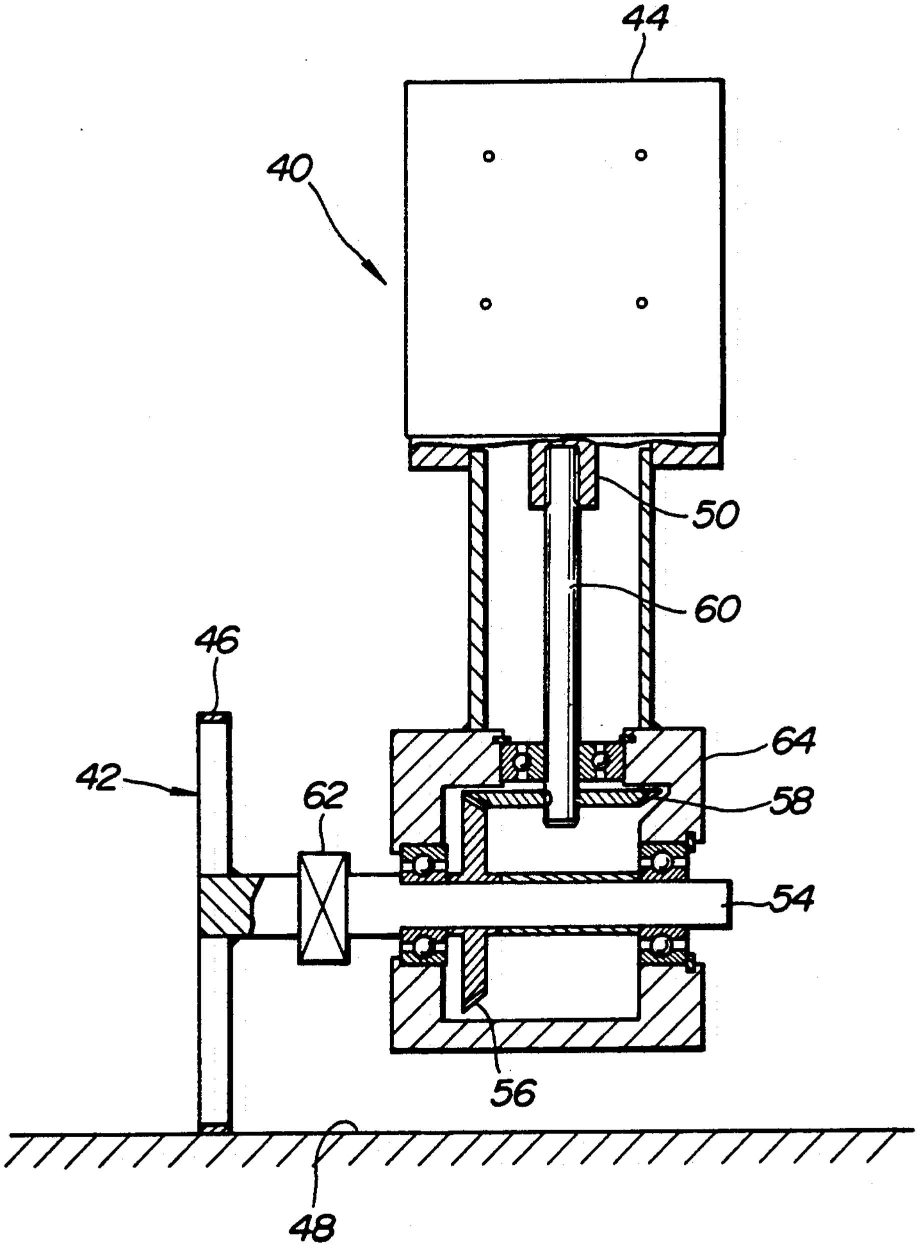
FIG. 4 is a front elevation of a hydraulic fluid discharge unit with a roller held in contact with the ground.

Referring to FIGS. 3 and 4, it is briefly explained how to operate the push-pull cylinder 36 thereby to control displacement speed of the face plate 28 relative to the platens 24 in response to a ground speed of the truck 10. In FIG. 3, the push-pull cylinder 36 is of the two rods type is illustrated as an example. Designated by the reference numeral 40 is a hydraulic fluid discharge unit which includes a roller 42 and a hydraulic regulator 44 drivingly connected to the roller 42. As best seen in FIG. 4, the roller 42 surrounded by an elastic band 46 is held in contact with the ground 48. The roller 42 is drivingly connected to a torque input shaft 50 of the hydraulic regulator 44 via a rotary shaft 54, bevel gears 56, 58, and a driver shaft 60 splined to the torque input shaft 50. In order to interrupt this driving connection when operation of the hydraulic regulator 44 is not needed, an electromagnetic clutch 62 is provided Although not specifically illustrated in FIG. 4, the hydraulic regulator 44 and a bevel gear housing 64 are mounted to the vehicle 10.

When the hydraulic regulator 44 is not driven by the roller 42, all of hydraulic fluid supplied from an engine driven pump 66 to the hydraulic regulator 44 via a pump pressure line 68 returns to a fluid reservoir 70 via a fluid return line 72. Under this condition, there is no supply of hydraulic fluid to two parallel regulated pressure lines 74, 76 which connect two outlets of the hydraulic regulator 44 to a pull cylinder chamber 78 and a push cylinder chamber 80, respectively. When, the push-pull operation mode is elected, the electromagnetic clutch 62 is engaged. Under this condition, when the truck 10 moves forward and the roller 42 rotates in one direction at a speed substantially proportional to the vehicle speed, the hydraulic regulator 44 discharges hydraulic fluid at a rate substantially proportional to the vehicle speed and supplies this hydraulic fluid to the pull cylinder chamber 78 via the fluid line 74 and connects the other hydraulic line 76 to the fluid return line 72. On the contrary, when the truck 10 moves backward and the roller 42 rotates in the opposite direction at a substantially proportional to the vehicle speed, the hydraulic regulator 44 discharges hydraulic fluid at a rate substantially proportional to the vehicle speed and supplies this hydraulic fluid to the pull cylinder chamber 80 via the fluid line 76 and connects the fluid line 74 to the fluid return line 72. In this manner, the push-pull piston is activated by the hydraulic fluid carrying a vehicle speed information and thus it displaces the face plate 28 in substantially proportional to the vehicle speed.

The hydraulic regulator having these functions is well known and commonly used as a power steering unit of a full hydraulic power steering system for forklift trucks. The construction will thereof be explained later.

Figure 5:
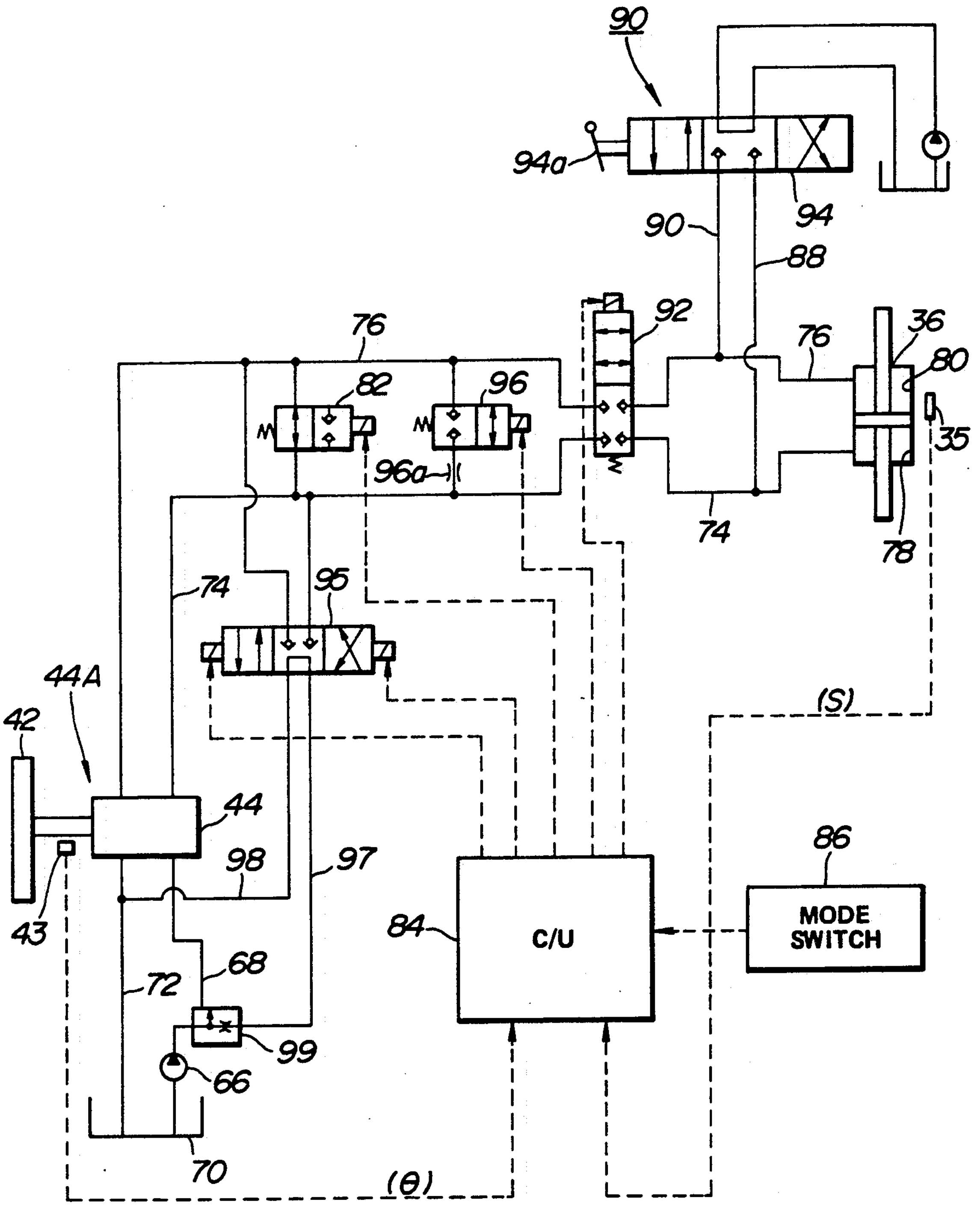
FIG. 5 is a hydraulic circuit diagram of a second embodiment of a control system according to the present invention.
Figure 6:
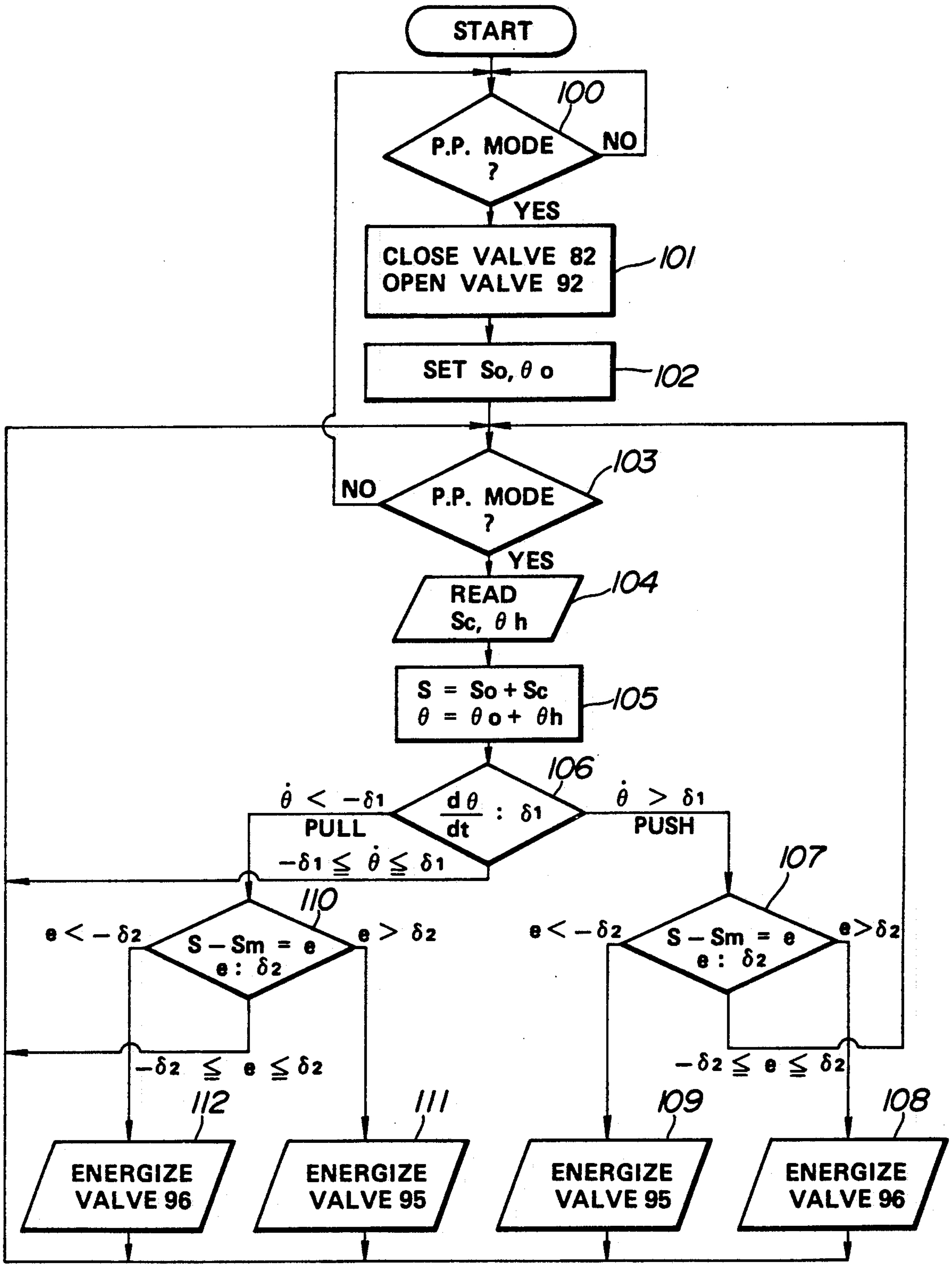
FIG. 6 is a flow diagram used to explain jobs to be executed by a control unit of the circuit shown in FIG. 5.
Figure 7:
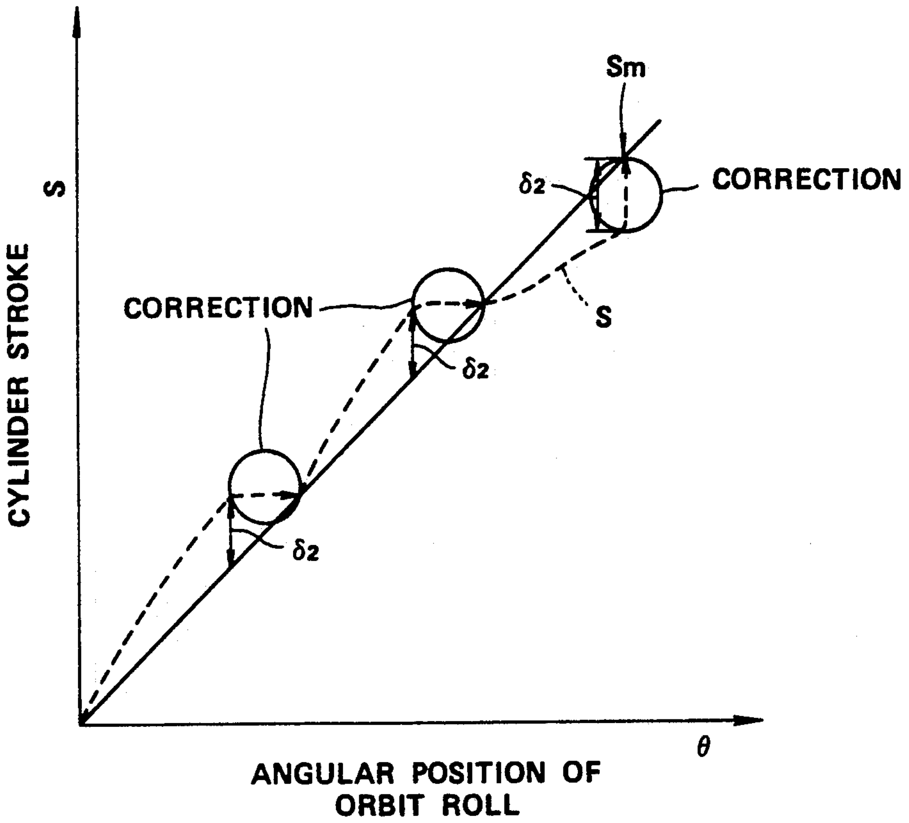
FIG. 7 is a graphical representation of one example of a target cylinder stroke ($S_m$) with regard to an angular position ($\theta$) of an orbitroll.

Referring next to FIGS. 5, 6 and 7, a second embodiment is described. This embodiment is generally the same as the first embodiment. However, as different from the first embodiment, a hydraulic fluid discharge unit 44A which is not provided with an electromagnetic clutch is employed. Thus, in this embodiment, a hydraulic regulator is always driven by a roller 42 to supply hydraulic fluid to one of fluid lines 74, 76 leading to a push-pull piston 36. In stead of an electromagneic clutch, an electromagnetic normally open type bypass valve 82 is provided to establish a bypass fluid path connecting the fluid lines 74, 76 to each other, thus preventing supply of hydraulic fluid from the hydraulic regulator 44 to the push-pull piston 36. The bypass valve 82 is energized under the control of a control unit 84 when an operator manually set a mode switch 86 to an "automatic push-pull mode." Energization of the bypass valve 82 results in closing the bypass fluid path so the hydraulic fluid from the hydraulic regulator is allowed to flow toward the push-pull cylinder 36.

Another feature of this embodiment which is not found in the first embodiment is the addition of manual mode circuit generally designated at the reference numeral 90 which includes two parallel fluid lines 88, 90 which join the fluid lines 74 and 76, respectively, an electromagnetic normally closed shut off valve 92 fluidly disposed in the fluid lines 74, 76 upstream of junctions where the two parallel fluid lines 88, 90 join the fluid lines 74, 76, respectively, and a manually operable three position changeover valve 94. Under the control of the control unit 84, the shut off valve 92 is energized when the mode switch 86 is set to the "automatic push-pull mode." Thus, the provision of the shut off valve 92 is to completely shut off fluid supply from the hydraulic regulator 44 to the push-pull cylinder 36 and the manual operation of the push-pull cylinder 36 by manually operating a lever 94*a* of the changeover valve 94 is ensured.

Another feature of this embodiment is to carry out a correction using an outflow control and an inflow control to synchronize displacement speed of the face plate of the push-pull mechanism to vehicle speed at a high level. Both of inflow and outflow controls are not always required, and inflow control or outflow control only is satisfactorily acceptable in certain cases.

In FIG. 5, for outflow control, there is disposed between the bypass valve 82 and the shut off valve 92 an electromagnetic normally open outflow control valve 96 which has a throttled fluid path 96*a* interconnecting the fluid lines 74, 76. For inflow control, an electromagnetic three position valve 95 is provided to control connection of a hydraulic fluid supply line 97 and a hydraulic fluid discharge line 98 to the fluid lines 74, 76. The fluid supply line 97 receives hydraulic fluid from a distributor valve 99. There are also provided a cylinder stroke sensor 35 and an angle sensor 43. The cylinder stroke sensor 35 detects stroke S of the push-pull cylinder 36 and generates a stroke signal (s), while the angle sensor 43 detects an angle $\theta$ of rotation of the input shaft 50 (see FIG. 4) of the hydraulic regulator 44 and generates an rotation angle signal ($\theta$). The output signals are supplied to the control unit 84.

In order to make understood how the control system shown in FIG. 5 operates, the flowchart shown in FIG. 6 is explained.

At a step 100, a judgement is made whether the mode switch 86 is set to the "automatic push-pull mode" or a "manual mode." If the "automatic push-pull mode" is selected, the program proceeds to a step 101 where a reference value $S_O$ of the cylinder stroke and a reference value $\theta_O$ of the angle of rotation of the input shaft of the hydraulic regulator 44 (orbitroll) are set. Then the program proceeds to a step 103 where a judgement is made whether the mode switch 86 is still set to the "automatic push-pull mode." or not. If the answer is YES, the program proceeds to a step 104 where reading operation is carried out based on the output signals of the sensors 35 and 43 to set a cylinder stroke $S_c$ from the referenece value $S_O$ and an angle of rotation $\theta_h$ of the input shaft of the hydraulic regulator 44 (orbitroll) from the reference value $\theta_O$. Then, at a step, a cylinder stroke S and an angle of rotation $\theta$ are determined. At a step 106, a first derivative of $\theta$ with respect to time is compared with a predetermined small positive value $\delta_1$ to determine whether the push cylinder 36 and thus the face plate 28 is displacing in a push direction or in a pull direction. If the first derivative of $\theta$ falls between $-\delta_1$ and $\delta_1$, the program returns to the step 103 without carrying out any correction control since the speed of rotation of the input shaft of the hydraulic regulator 44 (orbitroll) is low so that correction is not necessary. If the first derivative of $\theta$ is greater than $\delta_1$, i.e., displacement in the push direction, a difference e between S and $S_m$ (a target value) is compared with a predetermined small positive value $\delta_2$. Although not illustrated in this flowchart, the target value $S_m$ is determined as a function of $\theta$ and may be determined by a table look-up of a map as illustrated by the solid line in FIG. 7. If, at the step 107, the difference e falls between $-\delta_2$ and $\delta_2$, the program returns to the step 103 without carrying out any correction control. If the difference e is greater than $\delta_2$, meaning that the cylinder stroke tends to advance with regard to the target value $S_m$, the solenoid of the outflow control valve 96 is energized at a step 108 to open the throttled bypass fluid path 96*a*, thus suppressing this tendency (i.e., outflow control). If the difference e is less than $-\delta_2$, meaning that the cylinder stroke tends to retard, the program proceeds to a step 109 where the valve 95 is shifted to the left as viewed in FIG. 5 to supply additional fluid from the supply line 97 to the fluid line 76 to the push cylinder chamber 80. If, at the step 106, the first derivative of $\theta$ is less than $-\delta_1$, meaning that the push-pull cylinder 36 and thus the face plate 28 is displacing in the pull direction, the difference e is compared with the predetermined value $\delta_2$ at a step 110. If the difference e falls between $-\delta_2$ and $\delta_2$, the program return to the step 103 without carrying out any correction control. If the difference e is less than $-\delta_2$, meaning that the cylinder stroke tends to advance, the solenoid of the outflow control valve 96 is energized to open the throttled bypass fluid path 96*a*, thus suppressing this tendency. If the difference e is greater than $\delta_2$, meaning that the cylinder stroke tends to retard, the program proceeds to a step 111 where the valve 95 is shifted to the right as viewed in FIG. 5 to supply additional fluid from the supply line 97 to the fluid line 74 to the pull cylinder chamber 78. FIG. 7 illustrates diagrammatically how the difference between S and $S_m$ is reduced to zero according to the correction control just mentioned.

Figure 8:
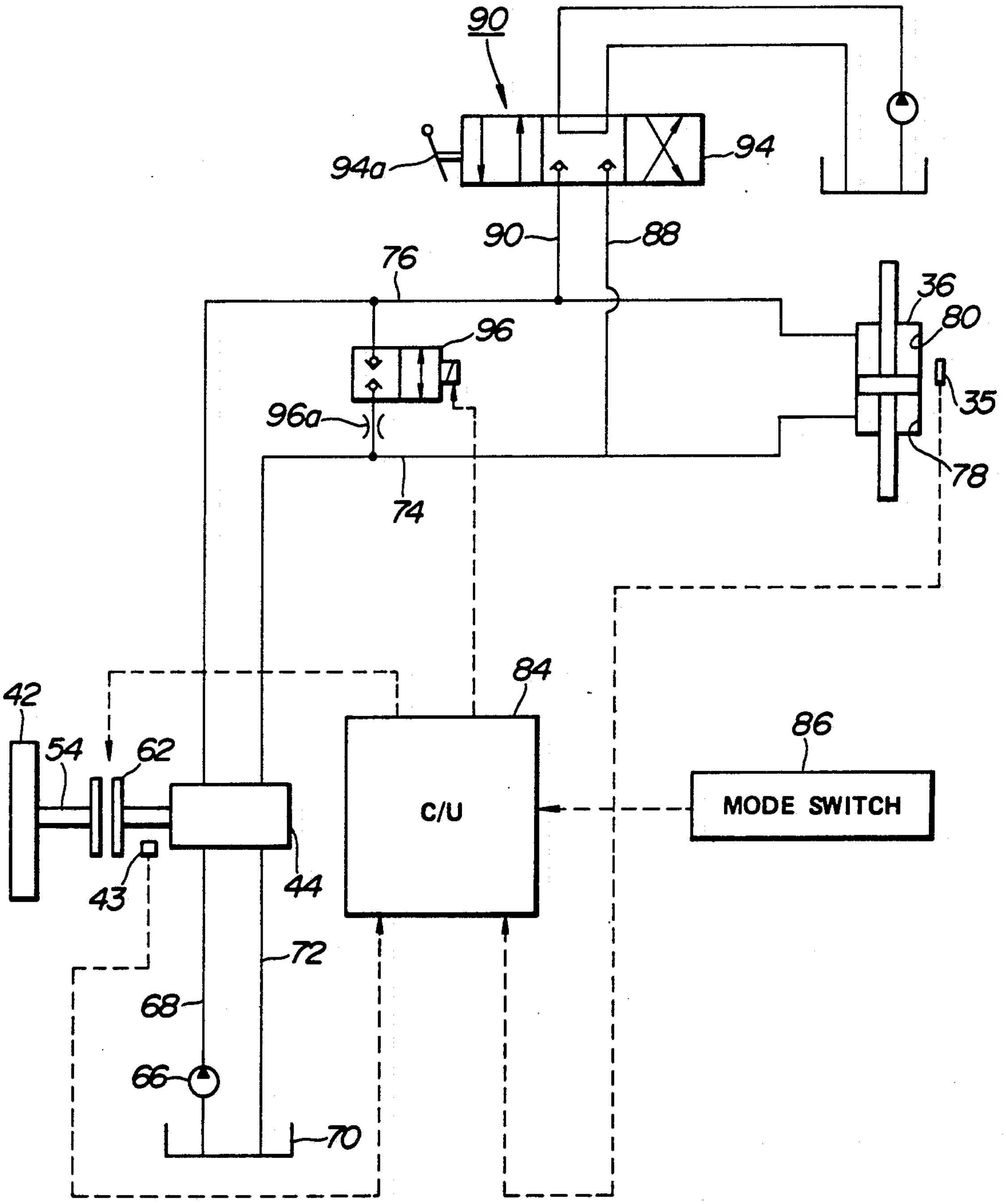
FIG. 8 is a hydraulic circuit diagram of a third embodiment of a control system according to the present invention.

Referring to FIG. 8, a third embodiment of a control system is described. This embodiment is different from the second embodiment shown in FIG. 5 in that the bypass valve 82 has been removed and an electromagnetic clutch 62 is provided instead in a similar manner to the first embodiment (see FIGS. 3 and 4), and the outflow valve 95 and its associated components including the flow distributor valve 99 and fluid supply and discharge lines 97, 98 have been removed. Thus it will be appreciated that the third embodiment is less complicated than the second embodiment.

Figure 9:
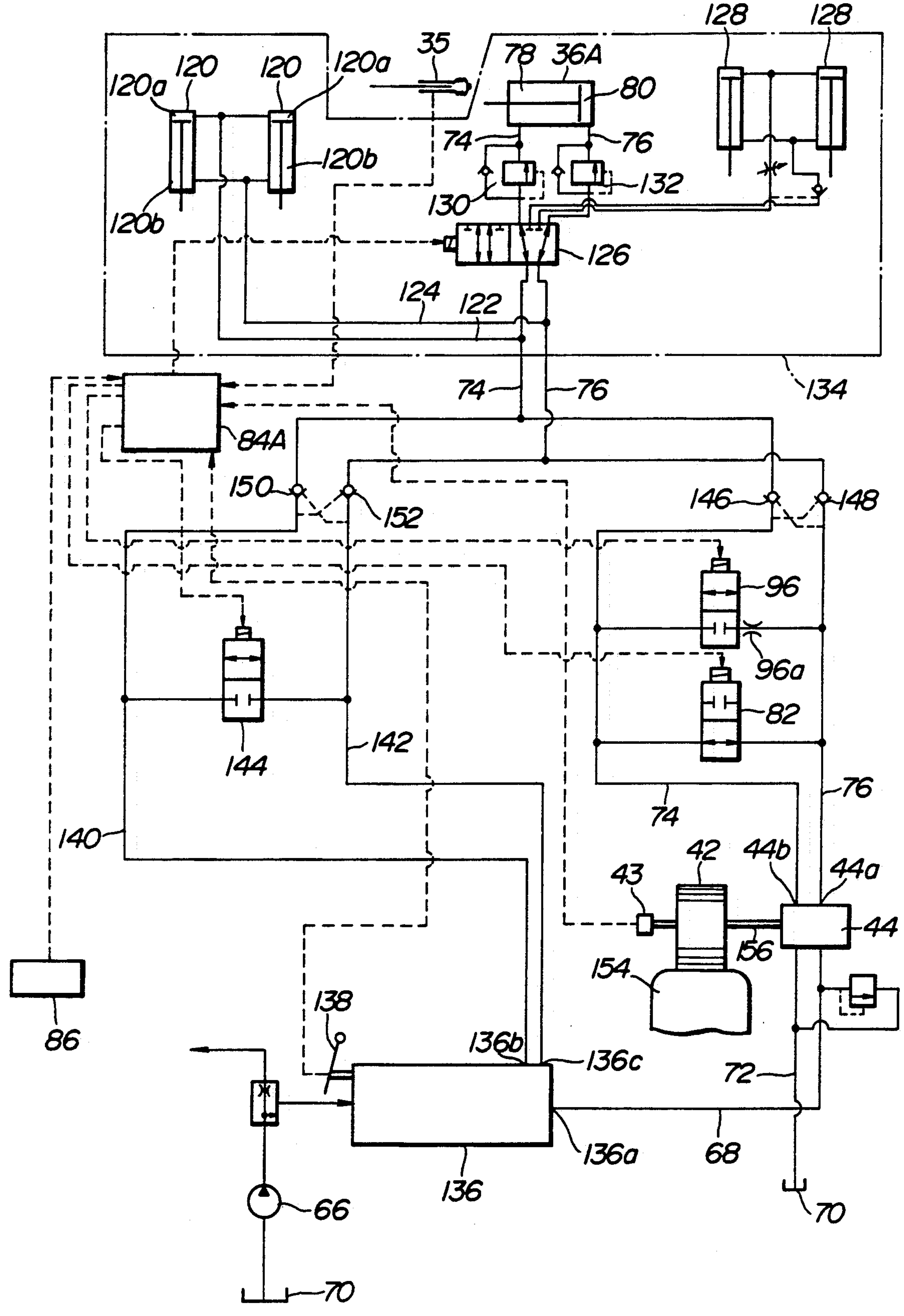
FIG. 9 is a circuit diagram illustrating another embodiment.

Referring to FIG. 9, a fourth embodiment of a control system is described. In FIG. 9, as different from the previously described embodiments, a push-pull cylinder 36A of a single rod type is used. The push-pull cylinder 36A has a pull cylinder chamber 78 and a push cylinder chamber 80 and the single rod extends through the pull cylinder chamber 78. This control system is designed to ensure a predetermined sequence of operation of the gripper 30 and operation of the push-pull mechanism 12 (ref. FIG. 1). The gripper 30 includes a pair of gripper cylinders 120, each having a grip side chamber 120*a* and a release side chamber 120*b*. Both of the grip side chambers 120 are connected via a fluid line 122 to a fluid line 74 provided for conveying hydraulic fluid from one outlet 44*a* of an orbitroll 44 toward the pull cylinder chamber 78 of the push-pull cylinder 36A, whereas the release side chambers 120*b* are connected via a fluid line 124 to a fluid line 76 provided for conveying hydraulic fluid from the other outlet 44*b* of the orbitroll 44 toward the push cylinder chamber 80 of the push-pull cylinder 36A. Fluidly disposed in the fluid lines 74, 76 is a two position changeover valve 126 which normally allow fluid supply to and discharge from the push-pull cylinder 36A through the fluid lines 74, 76. This changeover valve 126 includes a solenoid and shifts to the other operative position under the control of a control unit 84A. In FIG. 9, reference numeral 128 designates a pair of sheet retainer cylinders which are adapted to receive hydraulic fluid when the above-mentioned changeover valve 126 shifts to the other operative position. Arranged between the changeover valve 126 and the push-pull cylinder 36A are counterbalance valves 130 and 132. These valves 130, 132 prevent the supply of hydraulic fluid to the push-pull cylinder 36A until the gripper cylinders 120 complete their operation. The gripper cylinders 120, push-pull 36A, sheet retainer cylinder 128, counterbalance valves 1390, 132, and changeover valve 126 are interconnected to form a push-pull sequence circuit 134 which is well known.

Hydraulic fluid is discharged from an engine driven pump 66 and supplied to a manually operable control valve 136 with a manual lever 138. This control valve 136 is of the well known carryover type. When the manual lever 138 is manipulated to a plurality of operating positions including "PUSH" position and "PULL" position, the hydraulic fluid supplied by the pump 66 is distributed to appropriate hydraulic actuators of the lift truck, while, when the manual lever 138 is in its neutral position, all of the hydraulic fluid supplied by the pump 66 is discharged out of a carryover port 136 communicating via a pump pressure line 68 to the orbitroll 44.

This control valve 136 servers as a changeover valve to supply and discharge hydraulic fluid to and valve to supply and discharge hydraulic fluid to and from the gripper cylinders 120. Extending from a port 136*b* of the control valve 136 is a grip side fluid line 140 which joins the fluid line 74 and then connected to the fluid line 122 connected to the grip side chamber 120*a* of the gripper cylinders 120. Extending from another port 136*c* of the control valve is a release side fluid line 142 which joins the fluid line 76 and then connected to the fluid line 124 connected to the release side chambers 120*b* of the gripper cylinders 120. In operation, when the manual lever 138 is placed at "PULL" position, hydraulic fluid is supplied to the grip side fluid line from the port 136*b* and the release side fluid line 142 is drained via the port 136*c*. When the manual lever 138 is placed at "PUSH" position, the hydraulic fluid is supplied to the release side fluid line 142 and the grip side fluid line 140 is drained via the port 136*b*. In this manner the gripper 30 can be manually operated by the manual control valve 136. The position of the manual lever 138 is supplied to the control unit 84A. Between the gripper side and release side fluid lines 140, 142 is disposed a normally closed electromagnetic bypass valve 144 which is adapted to be energized upon completion of operation of the gripper 30.

Between the fluid lines 74 and 76 are connected pilot check valves 146, 148, while between the fluid lines 140, 142 are connected pilot check valves 150, 152. With the provision of these pilot check valves 146, 148 and 150, 152, hydraulic fluid supplied to the sequence circuit 134 is prevented from flowing back toward the orbitroll and the control valve 136 beyond these pilot check valves 146, 148 and 150, 152.

As will be readily understood from FIG. 9, in this embodiment a roller 42 is held in contact with a tire of the road wheel 154 and is drivingly connected to the orbitroll 44.

Figure 10:
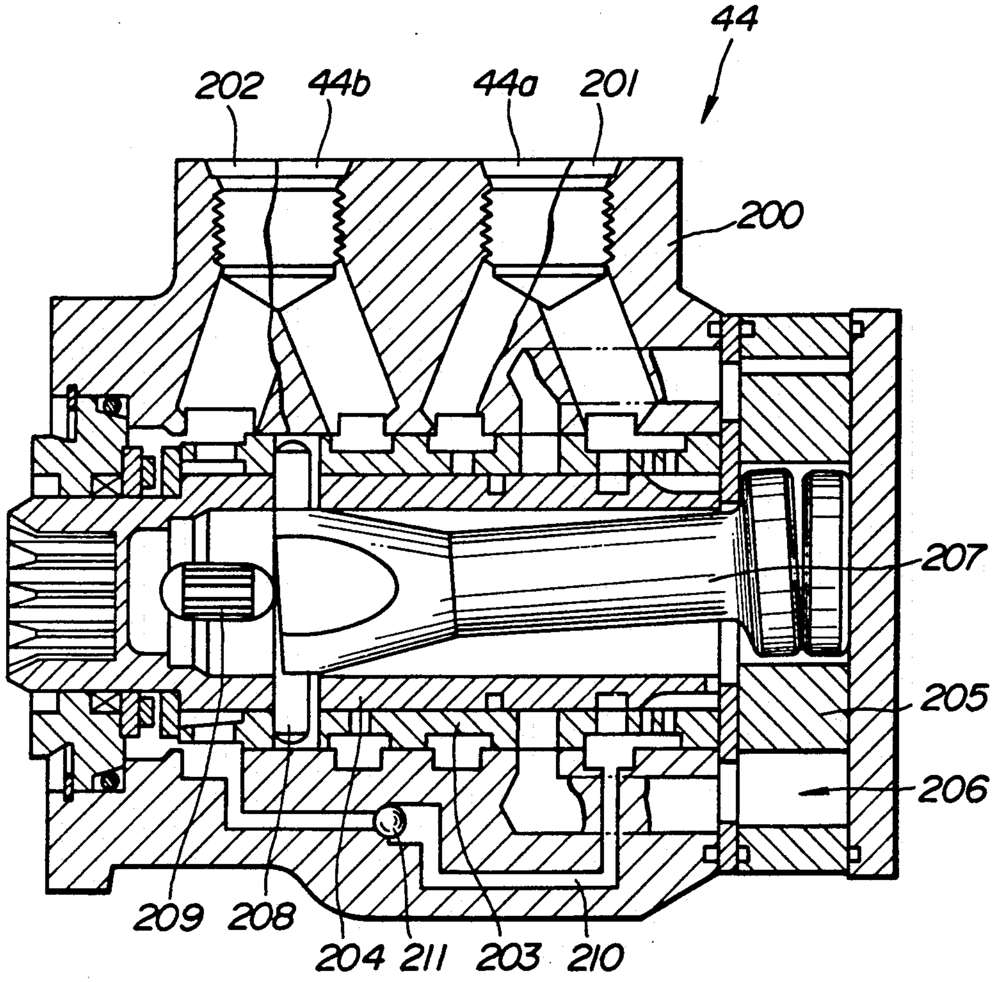
FIG. 10 is a sectional view of an orbitroll.

FIG. 10 is a longitudinal section of orbitroll 44 including a housing 200 formed with a left discharge or outlet port 44*b* and a right discharge or outlet port 44*a*.

A tank port 201 and a pump port 202 are arranged as spaced angularly from the right and left discharge ports 44a and 44b, respectively. The left discharge port 44b is connected to the fluid line 74, while the right discharge port 44a is connected to the fluid line 76. The pump port 201 is connected to a fluid line 68 extending from the carryover port 136a of the control valve 136, while the tank port 202 is connected via a fluid return line 72 to a fluid reservior tank 70.

Rotatably disposed within the housing 200 is a tubular sleeve 203 and rotatably disposed within the tubular sleeve 203 is a tubular spool 204. The sleeve 203 and spool 204 are formed with passages communicating with the ports 48a, 48b, 201 and 202. Near one end portion (right end as viewed in FIG. 10) there is provided a gear pump 206 which includes an eccentric inner gear 205. A drive 207 received in the spool 204 has one end operatively coupled with the inner gear 205 for rotation therewith. The spool 204, sleeve 203 and drive 207 are linked by a radial pin 208. With the pin 208, the drive 207 is operatively coupled with the sleeve 203 without any play in angular direction, but it is operatively coupled with the spool 204 with an appropriate amount of play in angular direction (for example, a rotation angle of 10°). There is arranged a centering spring 209 between the spool 204 and the sleeve 203. With this centering spring 209, centering of the spool 204 relative to the sleeve 203 in angular direction is made. For making a spline connection with an input shaft 156 (see FIG. 9), the spool 204 is splined at an end portion thereof situated near the other end of the housing 200 (the lefthand end as viewed in FIG. 10). Connected to the input shaft 156 is roller 42 which is held in contact with the upper peripheral portion of tyre 154 such that the roller 42 turns in accordance with rotation of the tire 154 as the vehicle moves (forward or reverse) and the rotation is transmitted via the input shaft 156 to the orbitroll 44.

When the orbitroll 44 is in its neutral position where there is no torque input, the spool 204 is centered with respect to the sleeve 203, causing operating hydraulic fluid supplied to the pump port 201 to flow back to the reservoir tank 60 via the tank port 202 without any discharge of operating hydraulic fluid from the left nor right outlet ports 44b and 44a. During movement of the lift truck 10 (see FIG. 1), rotation of the roller 42 is transmitted via the input shaft 156 to the spool 204, causing the spool 204 to rotate relative to the sleeve 203, allowing hydraulic fluid supplied to the pump port 201 to the inside of the gear pump 206. Owing to hydraulic pressure force developed during this process, the inner gear 205 of the gear pump 206 is urged to rotate in the same direction as the spool 206 is rotated. The hydraulic fluid is therefore discharged from the left discharge port 44b when the vehicle is moving in a forward direction or from the right discharge port 44a when the vehicle is moving in a backward direction. If the inner gear 205 is rotated as described above, the rotation of the inner gear 205 causes the drive 207 and the sleeve 203 that is connected by the pin 208 to rotate in such a manner as to follow rotation of the spool 204. Thus, as long as the spool 204 is being rotated, the sleeve 203 keeps following this movement with a small angular phase difference. As a result, the hydraulic fluid is continuously discharged from the left discharge port 44b or the right discharge port 44a. Therefore, the discharge rate of hydraulic fluid from the discharge port becomes substantially proportional to the ground speed of the vehicle. The capacity of the push-pull cylinder 36A and the discharge rate of the orbitroll 44 or the diameter of the roller 42 are selected such that the face plate 28 of the push-pull mechanism 12 is moved in the opposite direction to the direction of movement of the vehicle and in synchronized with the vehicle speed. Specifically, in this embodiment, the rate of discharge of the orbitroll 44 is set such that displacement of the push-pull mechanism 12 for a given amount of rotation of the orbitroll 44 is slightly greater than the vehicle body movement corresponding to the given rotation of the orbitroll 44. By so setting, the movement of the face plate 28 is generally synchronized with the movement of the vehicle body without posing any practical inconvenience.

Brief description is made regarding a structural feature of the orbitroll 44 which, when used in a power steering system, is inherently provided as a safeguard against failure of the associated oil pump of the power steering system to ensure steering function of the power steering system. For this purpose, the housing 200 is formed with a bypass passage 210 connecting the pump port 202 to the tank port 201. If the steering wheel is turned with a strong steering torque and the turning movement of the steering wheel is transmitted via the spool 204, pin 208, and drive 207 to the inner gear 206 to cause the inner gear to rotate, a vacuum develops within the gear pump 206. This causes fluid within the reservoir tank communicating with the tank port 201 to flow back to the gear pump 206. This operating fluid is discharged from the right and left discharge ports 44a and 44b. This phenomena is called as a "hand pump" phenomena and effective to maintain the steering function. Therefore, there is provided within the passage 210 a check valve 211 which interrupts fluid flow communication through this passage when the oil pressure pump works normally and allows fluid flow communication through the passage 210 when the oil pump breaks down.

In the case the above-mentioned known orbitroll 44 is employed as a source of hydraulic fluid to the fluid lines 74, 76, if supply of hydraulic fluid to the orbitroll 44 is interrupted by the control valve 136, hydraulic fluid within the reservoir 70 is drawn by the gear pump 206 during movement of the vehicle and this hydraulic fluid is supplied via the to the push-pull sequence circuit 134 to the push-pull cylinder 36A. This causes a problem.

In order to overcome this problem, according to this embodiment, there is provided a bypass valve 82. When the solenoid of the bypass valve 82 is energized, a bypass path is opened between the fluid lines 74, 76 so that hydraulic fluid discharged from one of the discharge ports of the orbitroll 44 returns via this bypass fluid path to the other discharge port of the orbitroll 44. This causes the orbitroll 44 to idle.

One main feature of this embodiment is the provision of the normally closed bypass valve 144 which normally allows fluid supply from the control valve 136 to the gripper cylinders 120. This bypass valve 144 is opened to prevent a further supply of hydraulic fluid to the sequence circuit 134 when the stroke sensor 35 detects the completion of the operation of the gripper 30. Detection of completion of the operation of the gripper 30 is possible by detecting the beginning of the stroke movement of the push-pull cylinder using the stroke sensor 35 since, owing to the function of the counterbalance valves 130, 132 of the sequence circuit 134, the sequence of operation is strictly kept. Thus, it will be readily understood the detection of the completion of the operation of the gripper 30 by other means or sensors. For example, a limit switch may be used to detect displacement of grip jaw 32 of the gripper 30, or a preseure sensor may be used to detect a pressure increase acting on the counterbalance valves 130, 132. From the description as above, it will be appreciated that, with the provision of the fluid lines 140, 142 with the bypass valve 144 therebetween, the gripper 30 is activated by the hydraulic fluid supplied from the control valve 136 through these fluid lines 140, 142 and a further supply of hydraulic fluid from these lines 140, 142 to the sequence circuit 134 upon completion of the operation of the gripper 30 is automatically prevented.

Figure 11:
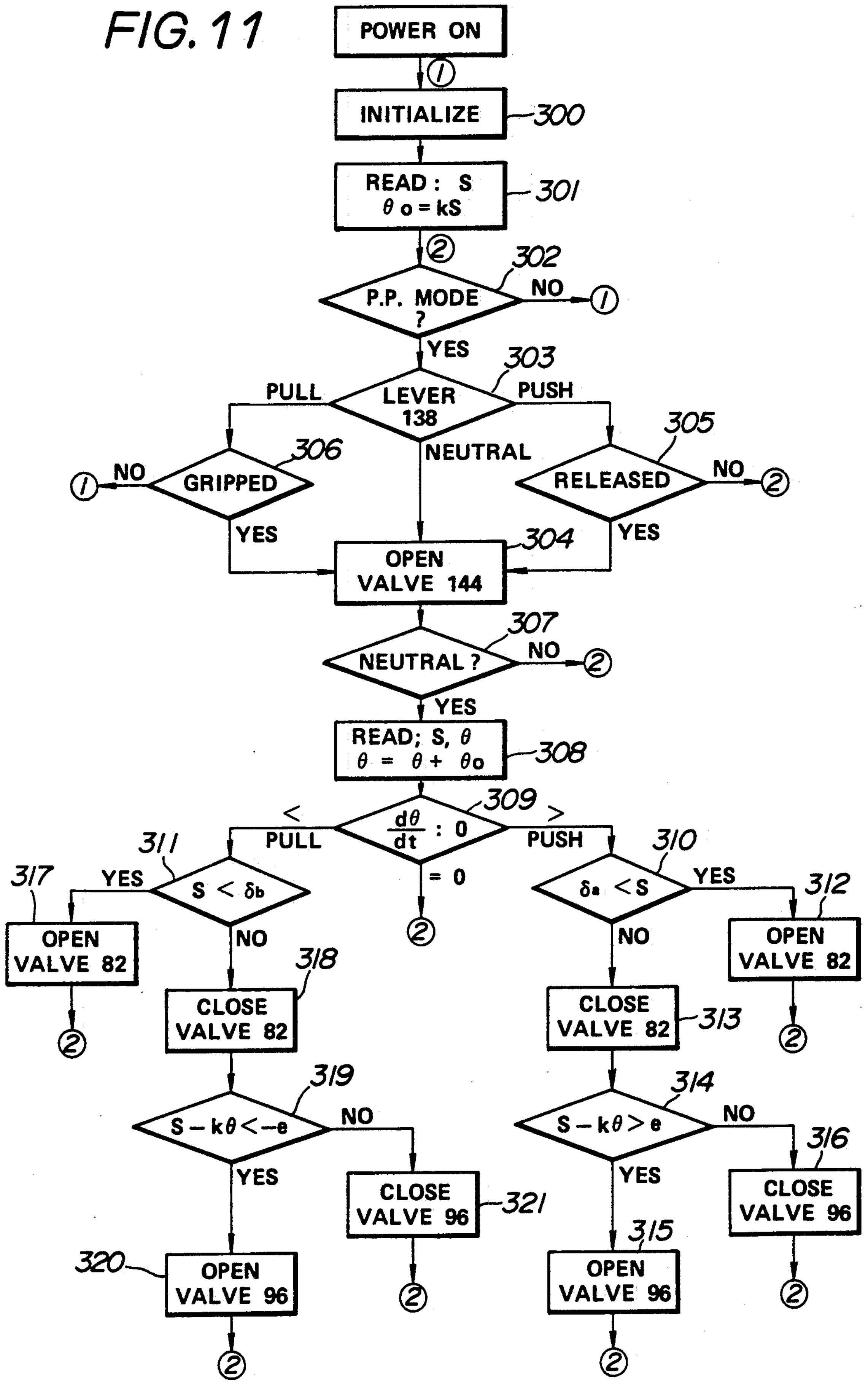
FIG. 11 is a flowchart.

The flowchart of FIG. 11 is explained.

Let it be assumed that the vehicle power source is ON and the mode switch 86 is placed at the "MANUAL MODE" position. The valves 82, 96 and 144 are set to their normal position at a step 300. Then, at a step 301, the output of the stroke sensor 35 is obtained to determine an initial position $S_0$ of the face plate 23 and then the output signal of the sensor in the form of a rotary encoder 43 is obtained to determine an initial rotation angle $\theta$ ($\theta = k \cdot S_0$), where k: a coefficient, of the orbitroll 44.

At the sebsequenmt step 302, a judgement is made whether the mode switch 86 is placed at the "AUTOMATIC PUSH-PULL MODE" position. If this mode position is not selected (NO), the program returns to the step 300, while if the automatic mode is selected (YES), the program proceeds to the next step 303. If the automatic mode position is selected, the bypass valve 82 is closed. At the step 303, the position of the lever 138 of the control valve 136 is detected and a judgement is made whether the lever 138 is placed at the "NEUTRAL" position or at the "PUSH" position or the "PULL" position. As a result of judgement made at the step 303, if the lever 138 is placed at the "NEUTRAL" position, the program proceeds to a step 304, if it is placed at the "PUSH" position, the program proceeds to a step 305, and if it is placed at the "PULL" position, the program proceeds to a step 306.

At the step 304, the bypass valve 144 is opened, opening bypass fluid flow connecting the fluid lines 140, 142. On the other hand, if at the step 303 it is judged that the "PUSH" position or "PULL" position is selected, since the bypass valve 144 is closed, the hydraulic fluid discharged to one of the fluid lines 140, 142 is supplied to the push-pull sequence sequence circuit 134. Under this condition, since the counterbalance valves 130, 132 are provided, the hydraulic fluid supplied thereto is supplied to the gripper cylinders 120. When the lever 138 is in set to the "PUSH" position, the hydraulic fluid is supplied to the release side chambers **120*b* of the gripper cylinders 120 through the fluid lines 142, 76 and 124, while when the lever 138 is in the "PULL" position, the hydraulic fluid is supplied to the grip side chambers 128*a* of the gripper cylinders 120. Subsequently, at the step 305 or 306, a judgement is made whether the operation of the gripper 30, namely, gripping operation or releasing operation, has completed or not. Completion of releasing operation or gripping operation is detected by the stroke sensor 35. The completion of the releasing operation of the gripper 30 is immediately followed by the beginning of displacement of the face plate 28 in the push direction, so the instance when the releasing operation has completed is detected by detecting the beginning of the displacement of the face plate 28 in the push direction. Similarly, the completion of the gripping operation of the gripper 30 is detected by detecting the beginning of the displacement of the face plate 28 in the pull direction. If it is judged at the step 305 that the completion of releasing operation of the gripper 30 has been detected or it is judged at the step 306 that the completion of gripping operation of the gripper 30 has been detected (YES), the program proceeds in both cases to the step 304 where the second solenoid operated on/off valve 70 is shifted to its valve open position thereby to interrupt supply of operating fluid from the manual circuit 44 to the push-pull sequence circuit 32. This causes the gripping mechanism 112 to hold its position at the completion of releasing operation or gripping operation. If it is judged at the step 305 that releasing operation has not been completed yet, the program returns to the step 302, while if it is judged at the step 306 that gripping operation has not been completed yet, the program returns to the step 300. What is to be done by an operator after the completion of releasing operation or gripping operation of the gripping mechanism 112 is to confirm by eye recognition whether the gripping mechanism has completed its task and then to move the lever 138 of the control valve 136 to the "NEUTRAL" position, allowing supply of hydraulic fluid to the orbitroll 44 from the carryover port 136*a*. This confirmation may be made easier if a pilot lamp is turned on or a voice information is produced upon completion of the operation of the gripper 30**.

Next, a judgement is made at a step 307 whether the lever 138 of the control valve 136 is in the "NEUTRAL" position or not. If it is judged that the lever 138 is not in the "NEUTRAL" position (NO), the program returns to the step 302. When the lever 138 is in the "NEUTRAL" position, the hydraulic fluid is supplied from the carryover port **136*a* to the orbitroll 44, causing the orbit roll 44 to get ready to discharge hydraulic fluid as soon as the vehicle starts moving off from a standstill. Since the bypass valve 82 was closed the automatic mode was selected, the hydraulic fluid discharged from the orbitroll 44 can rear the push-pull sequence circuit 32. Therefore, immediately after the vehicle has moved off from a standstill, the hydraulic fluid discharged by the orbitroll 44 is supplied the push-pull sequence circuit 134. After the gripper 30 has completed its operation, the counterbalance valves 130, 132 opens fluid flow path to the push-pull cylinder 36A. Thus, the face plate 28 of the push-pull mechanism 12 starts displacing immediately after the vehicle starts moving off from the standstill. During backward movement of the vehicle, the face plate 28 displaces in the push direction, whereas during forward movement of the vehicle, the face plate 28 displaced in the pull direction. As a result, the face plate 28** stays still relative to the ground during forward and rearward movements of the vehicle.

In this manner, during the automatic mode the push-pull mechanism 12 is activated in synchronized with movement of the vehicle. Thus, after the judgement made at the step 307 that the lever 138 is placed at the "NEUTRAL" position, the program proceeds to a step 308 where the output signals of the stroke sensor 35 and encoder 43 are obtained by reading operation and the displacement of the face plate 28 is determined by calculating an equation that $S+S_0$. Then, at the subsequent step 309 and onwards, the correction of activation of the push-pull mechanism 111 is carried out. That is, at the step 309, the time derivative of an angle of rotation of the orbitroll 44 ($d\theta/dt$), namely, an angular velocity, is compared with 0 to find out whether the face plate 28 displaces in the push direction or the pull direction.

If the angular velocity is positive, the program proceeds to a step 310, while the angular velocity is negative, the program proceeds to a step 311. At the step 310, the displacement S of the face plate 114 which is determined at the step 308 is compared with the maximum value δa (delta a) to judge whether the displacement S has attained the maximum value δa (delta a). If the maximum value δa (delta a) has been attained (YES), the program proceeds to the step 312 the bypass valve 82 is opened, interrupting the fluid supply to the push-pull sequence circuit 134. If, on the other hand, at the step 310 it is judged that the face plate 28 has not attained the maximum displacement δa (delta a) (NO), the program proceeds to a step 313 where the bypass valve 82 is closed, and then to a step 314 where it is judged whether the difference between the actual stroke S of the face plate 28 and a target stroke kθ is greater than a predetermined positive small value e or not. What is judged is whether the face plate 28 has displaced beyond the target value or not. If the displacement of the face plate 28 is excessively beyond the target value (YES), the program proceeds to a step 315 where the outflow valve 96 is opened, effecting correction, and then the program returns to the step 302. If, on the other hand, the result of judgement made at the step 314 is NO, the program proceeds to the step 316 where the inflow valve 96 is closed, then the program returns to the step 302. If the angular velocity is negative, the program proceeds to a step 311 where it is judged whether the displacement S of the face plate 28 has attained a minimum displacement δb (delta b) or not. If the minimum displacement δb (delta b) has been attained (YES), the program proceeds to a step 317 where the bypass valve 82 is opened. If the minimum displacement δb (delta b) has not been attained (NO), the program proceeds to a step 318 where the bypass valve 82 is closed, and to step 319 where a judgement is made whether a difference between the actual stroke S and the target stroke kθ is less than a certain negative value −ξ (xi). If the answer to this inquiry is YES, the program proceeds to a step 320 where the outflow valve 96 is opened, and the program returns to the step 302. If the answer to the inquiry is NO, the program proceeds to a step 321 where the outflow valve 96 is closed, and the program returns to the step 302.

Figure 12:
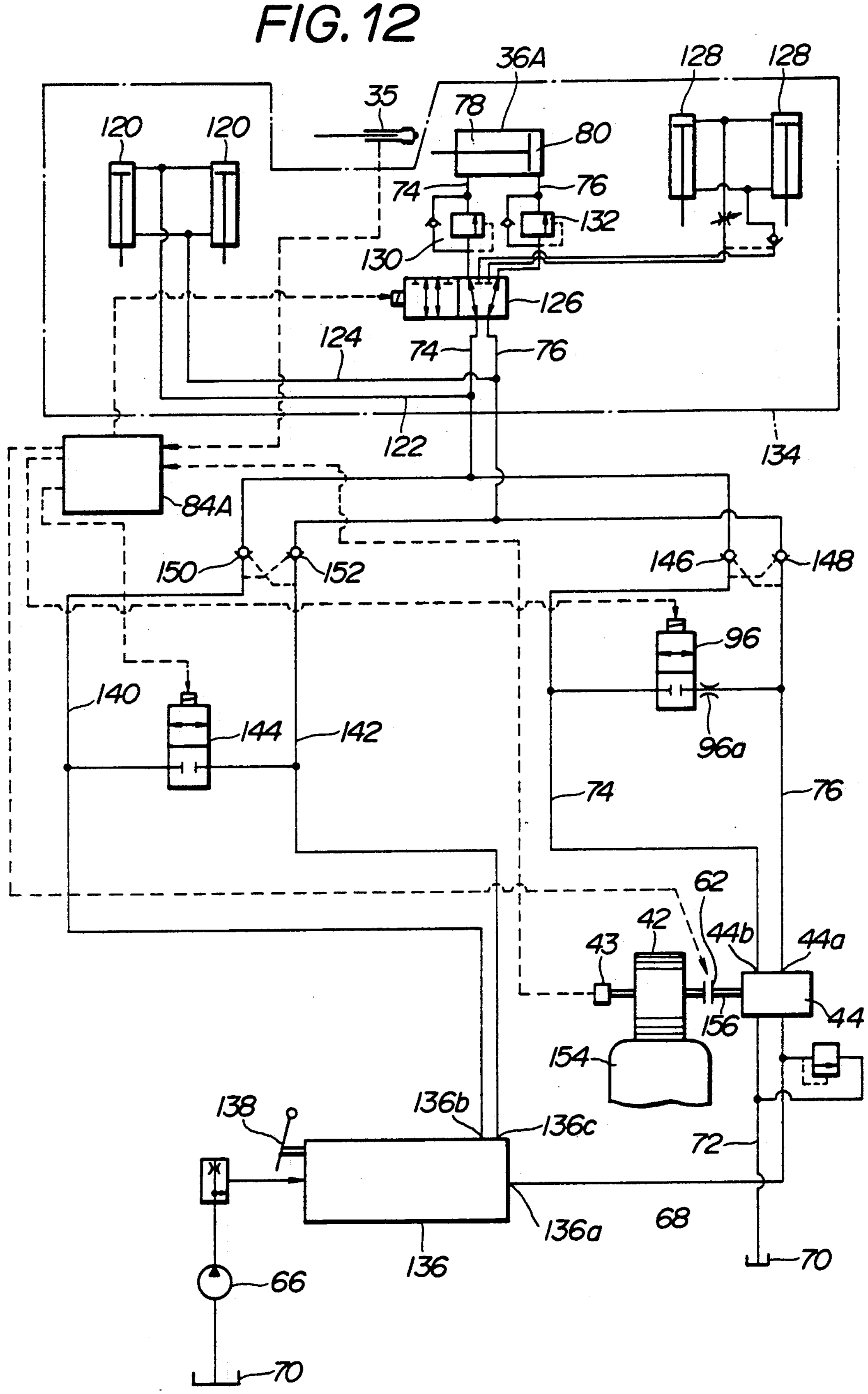
FIG. 12 is a circuit diagram of still another embodiment.

Referring to FIG. 12, a fifth embodiment is described. This embodiment is substantially the same as the fourth embodiment shown in FIG. 9 except that instead of the bypass valve 82, an electromagnetic clutch 62 is provided to interrupt the driving connection between a roller 42. The electromagnetic clutch 62 is operated by a control unit 84A. The control program involving the control of the electromagnetic clutch 62 can be made by replacing, in the flowchart of FIG. 11, the content of the step 317 with a statement "disengage clutch 62", the content of the step 318 by a statement "engage clutch 62", the content of the step 313 by the statement "engage clutch 62", and the content of the step 312 by the statement "disengage clutch 62."

Figure 13:
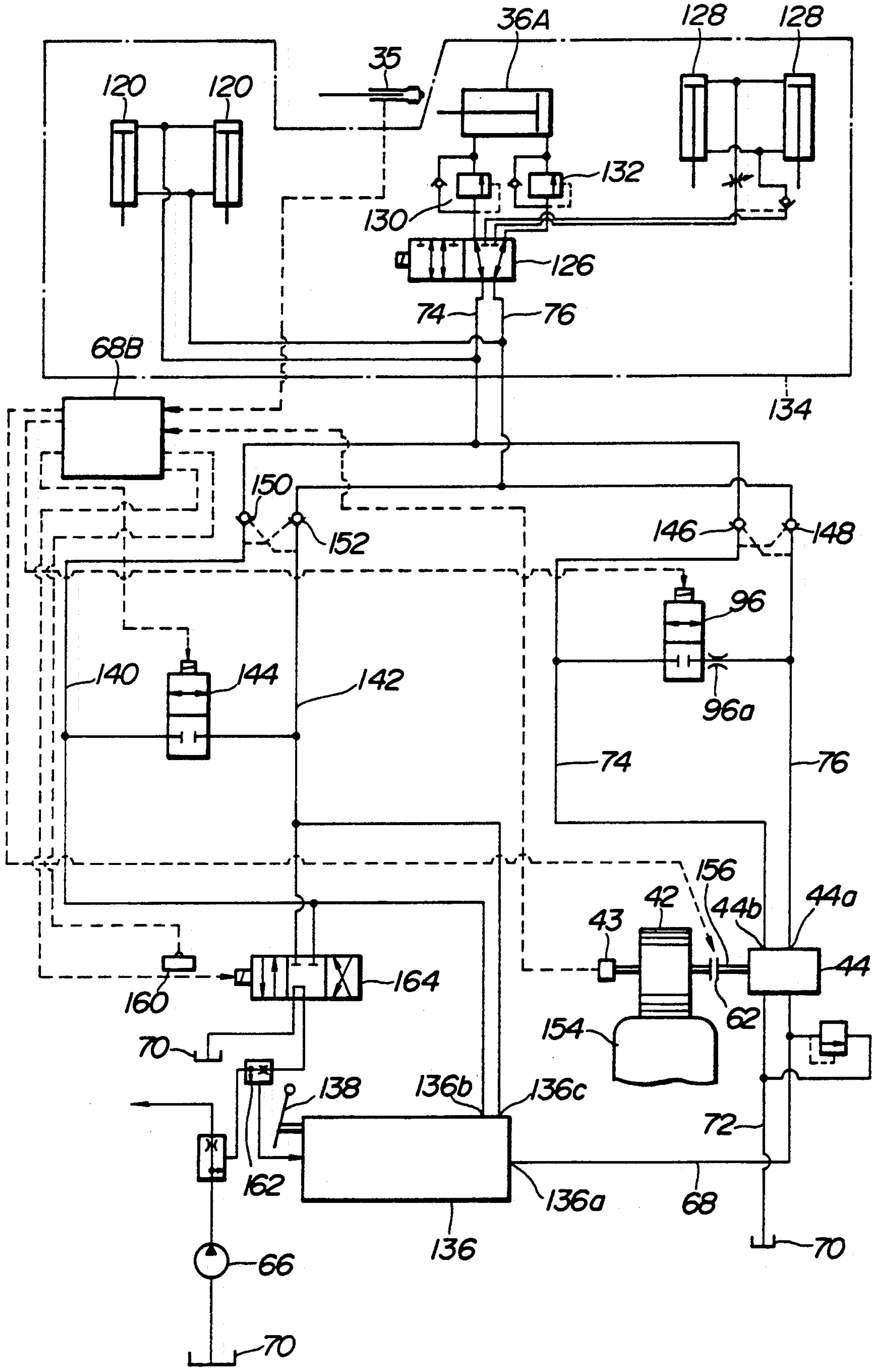
FIG. 13 is a circuit diagram of still another embodiment.

Referring to FIG. 13, a sixth embodiment is described. This embodiment is different from the just described embodiment in that instead of performing a manual operation of the gripper, the gripper operation is performed by a button 160, a flow divider valve 162 as a source of hydraulic fluid, a changeover valve 164 having three positions and a control unit 68B. The operator presses the button to instruct the control unit 68B whether the gripper 30 is to perform gripping operation or releasing operation or neutral. Then, the control unit 68B shifts the changeover valve 164 to assume the appropriate one of three positions. Then, the gripper 30 is set into operation. Upon completion of the operation, a stroke sensor 35 sends a signal to the control unit 16B and then the changeover valve 164 resumes its neutral position as illustrated.

Figure 14:
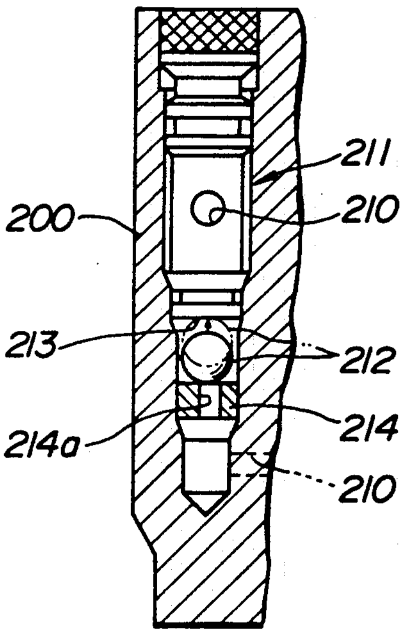
FIG. 14 is a fragmentary view of FIG. 10.
Figure 15:
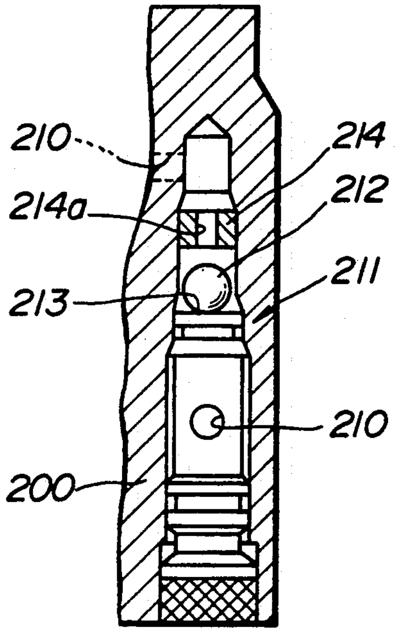
FIGS. 15 to 17 are similar views to FIG. 14 but modified.
Figure 16:
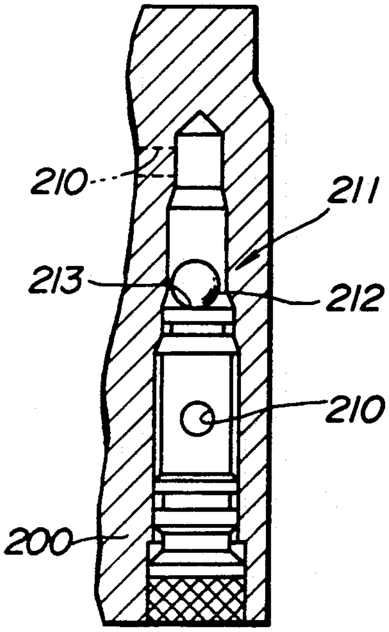
Figure 17:
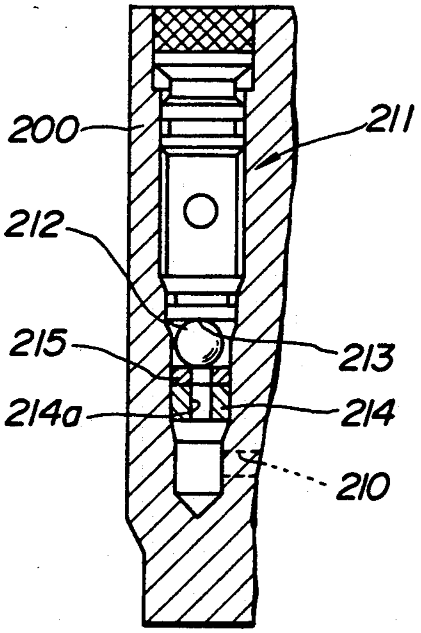

Referring to FIGS. 14 to 17, there are described various ideas to secured idle operation of orbitroll 44. FIG. 14 is a fragmentary view of the orbitroll 44 in its normal installed position. As illustrated, an inertia ball 212 is normally disengaged from a valve seat 213 to keep a passage 210 of the orbitroll 44 normally open. Thus, the so-called hand pumping operation can be carried out when the passage 212 is open. In this position, hydraulic fluid from the pump enters through a passage 214*a* lifting the ball 212*m* to engage the valve seat 213. Thus, one simple measure to kill this function is to arrange the orbitroll 44 upside down so that as shown in FIG. 15, the ball 212 is always seated to close the passage 211. Alternatively, in order to secure seating of the ball 212, a retainer 214 has been removed in the case of FIG. 16. Alternatively, with the orbitroll 44 held in its normal installing position, a spacer 215 has been inserted between the ball 212 and the retainer 214 as shown in FIG. 17. With these measures illustrated in FIGS. 15, 16 and 17, so-called hand pumping function of the orbitroll 44 is eliminated to a satisfactory level.

In the previously described embodiment shown in FIG. 12, since the push-pull cylinder 36A is of the so-called single piston rod type, the effective cylinder capacity of the chamber 78 through which the piston rod extends through is less than the cylinder volume of the other cylinder chamber 80. Thus, in the case the hydraulic fluid is supplied by the orbitroll 44 at the same sate to both of the cylinder chambers selectively, the outflow control valve 96 has carried out a correction to reduce the displacement in the pull direction to agree with the displacement in the push direction.

Figure 18:
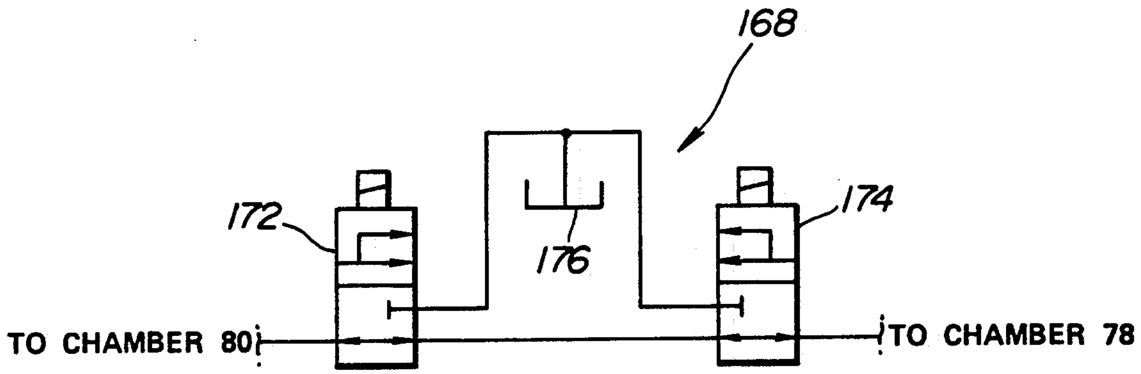
FIGS. 18–19 are diagrams illustrating proportional flow type solenoid valves.
Figure 19:
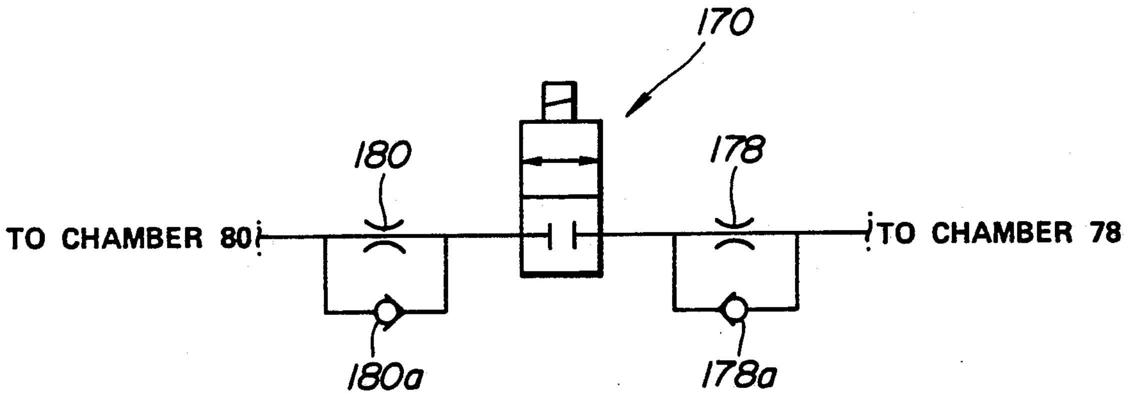

According to a further embodiment, the outflow control valve 96 has been replaced with a proportional distribution type electromagnetic valve 168 as shown in FIG. 18 or 170 as shown in FIG. 19. These valves 168 and 170 function not only to carry out corrrection but also to vary the ratio of fluid supply to one of the two cylinder chambers 78 and 80 of the push-pull cylinder 36A to fluid supply to the other cylinder chamber. In the case of the valve 168 shown in FIG. 18, there are first and second solenoid changeover valves 172 and 174. According to this valve 168, by varying ON/OFF ratio of the solenoid valves 172 and 174, the flow of fluid to a drain 176 can be varied.

In the case of the valve 170 shown in FIG. 19, the size of the orifices 178 and 180 are set in a desired manner, the ratio of the fluid supply to one of the chamber 78, 80 relative to the other can be varied. The profices 178 and 180 are provided with one-way check valves 178*a* and 180*a*.

Figure 20:
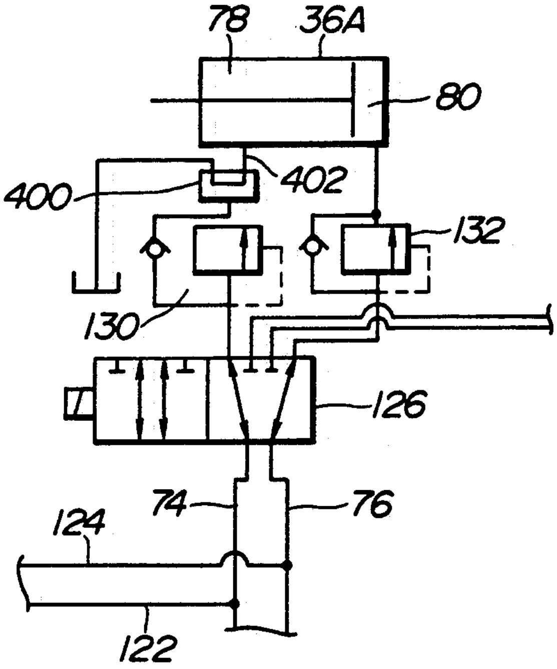
FIG. 20 is a fragmentary view of a circuit of still another embodiment.
Figure 21:
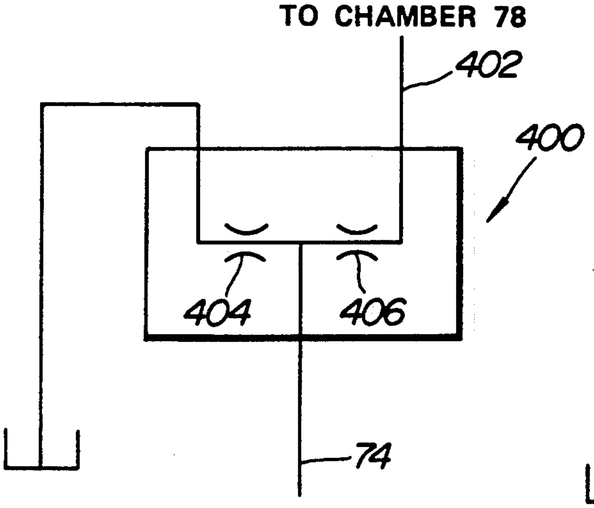
FIGS. 21–22 are diagrams illustrating two tuning valves.

Referring to FIGS. 20 and 21, another embodiment is described. This embodiment is substantially the same as the embodiment illustrated in FIG. 12. However, this embodiment is different from that shown in FIG. 12 in the provision of a so-called tuning valve 400 which is designed to decrease the flui supply to the cylinder chamber 78 which has less cylinder volume as compared to the other cylinder chamber 80 since the rod of the piston extends therethrough. As will be readily understood from FIG. 21, the hydraulic fluid supplied through the fluid line 74 is slip into two flow, one being directed via an orifice 404 toward a drainage, the other being supplied via another orifice 406 to the cylinder chamber 78 of the push-pull cylinder 36A. Thus, suitably setting the size of the orifices 404 and 406, a desired fluid supply to the cylinder chamber 78 can be obtained.

Figure 22:
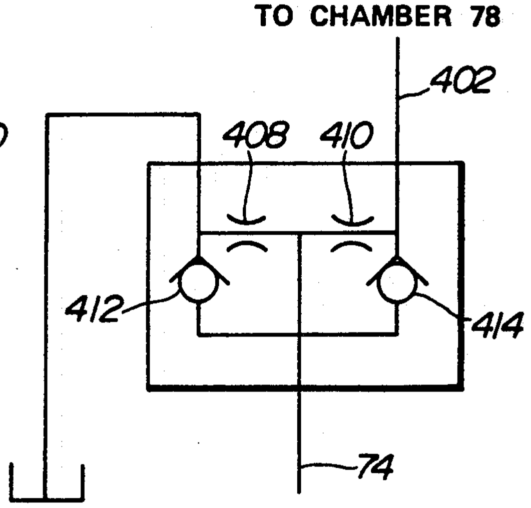

FIG. 22 showns another example wherein in addition to two orifices 408 and 410, two check valves 412 and 414 are arranged as shown. In this case, too, the flow of fluid is split into two, one passing through the orifice 408, the other passing through the other orifice 410.

Figure 23:
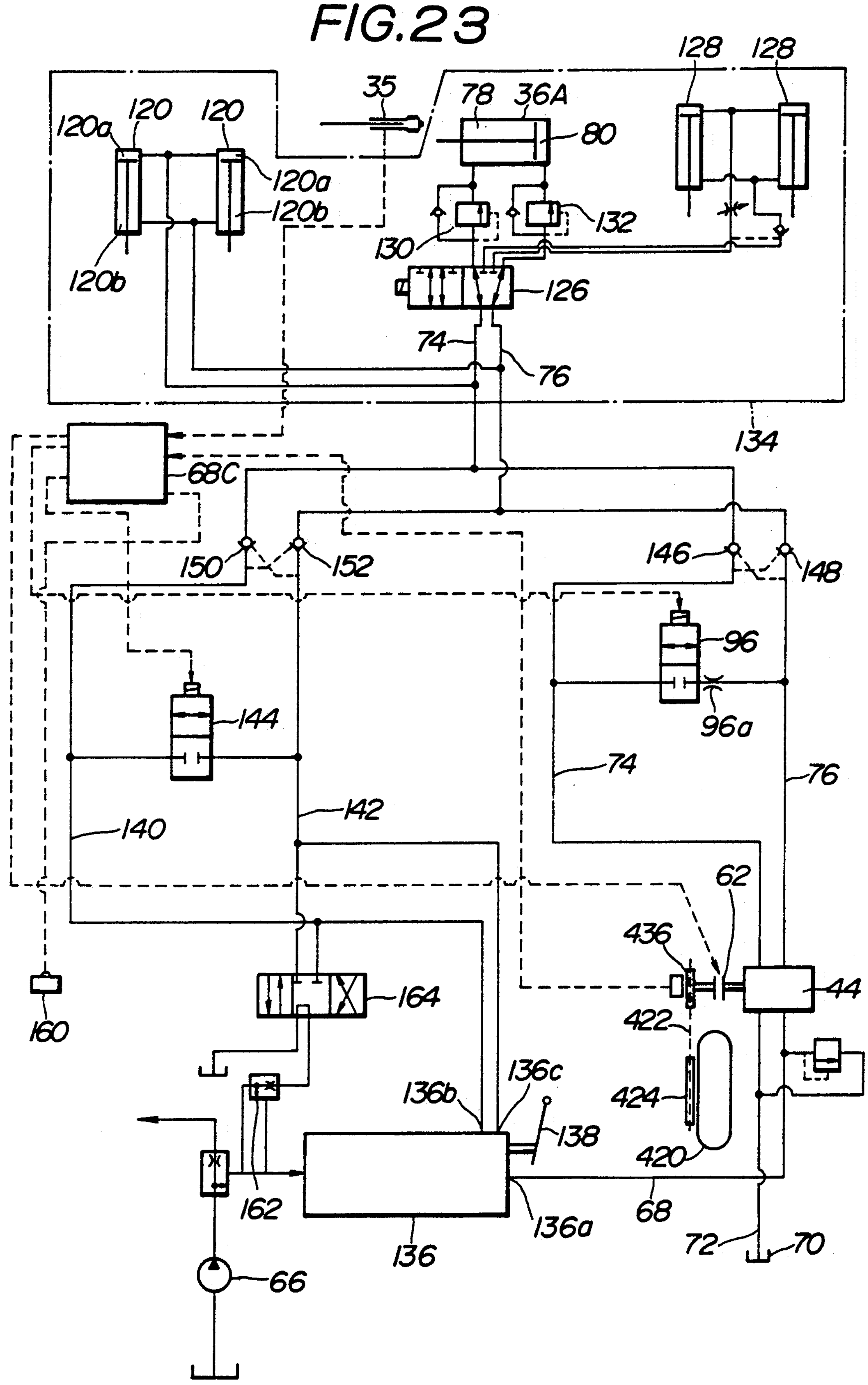
FIG. 23 is a circuit diagram of further embodiment.
Figure 24:
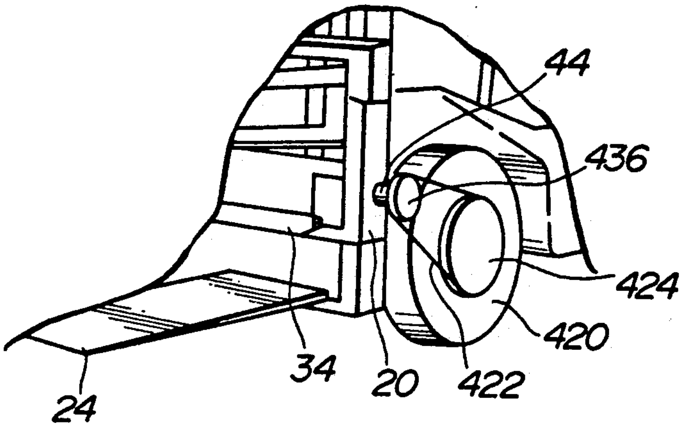
FIG. 24 is a fragmentary view of FIG. 1 but illustrating the feature of the embodiment shown in FIG. 23.
Figure 25:
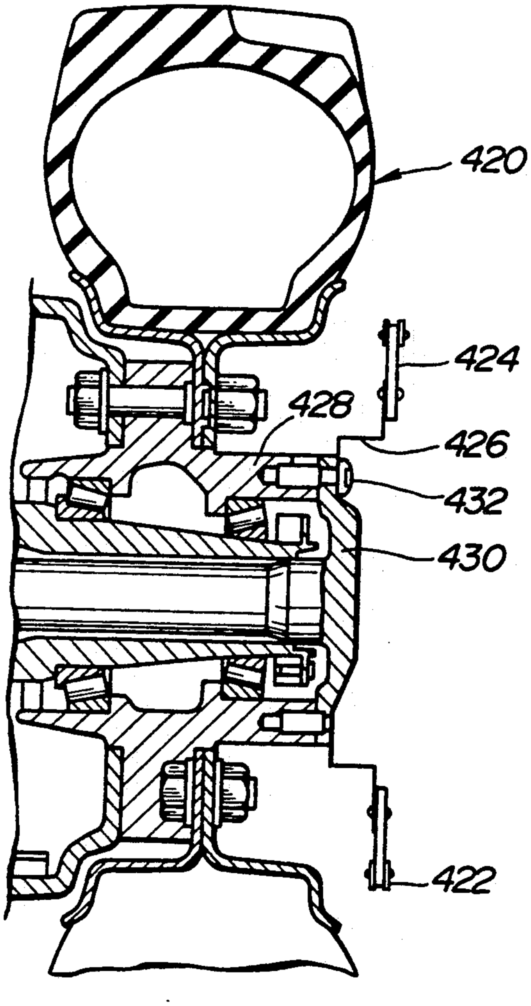
FIG. 25 is a sectional view of a vehicle road wheel with a large sprocket for chain drive connection with a an orbitroll.
Figure 26:
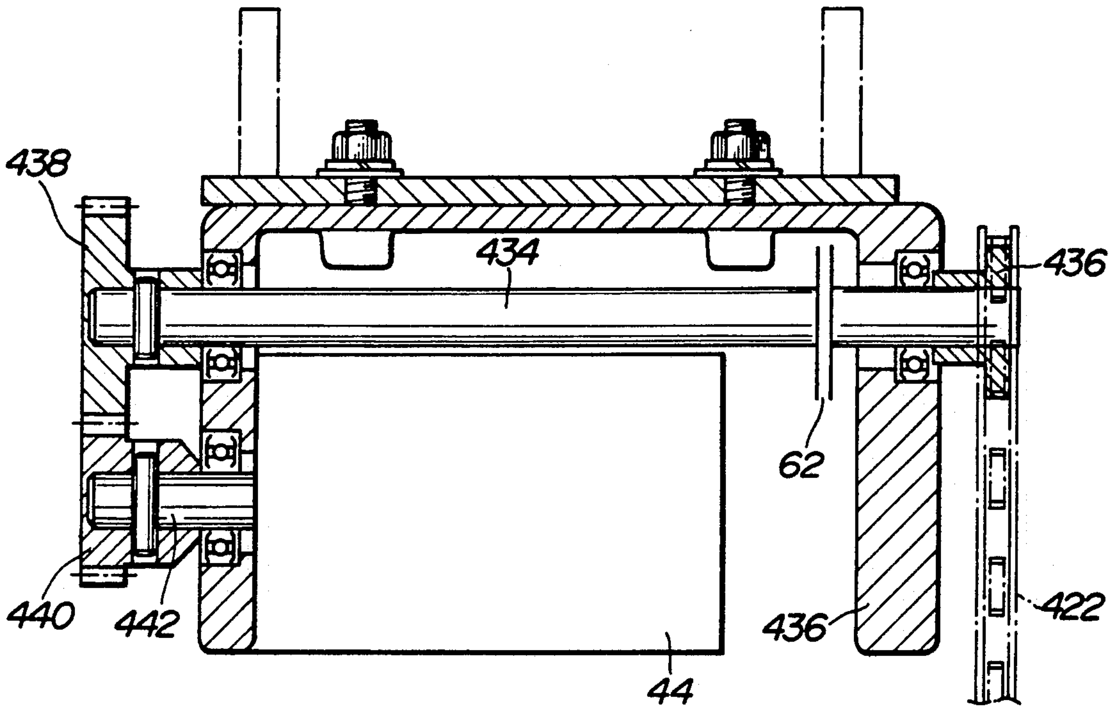
FIG. 26 is a sectional view showing layout of an orbitroll.

Referring to FIGS. 23 and 24, still another embodiment is described. This embodiment is substantially the same as the embodiment shown in FIG. 13. The main difference resides in that in the embodiment shown in FIG. 13, the roller 42 is in frictional contact with the tire 154, whereas in this embodiment, as best seen in FIG. 24, an orbitroll 44 is mounted to a mast 20 and driven by a vehicle road wheel 420 via a chain drive 422. As best seen in FIG. 25, a relatively large sprocket 420 is mounted to the road wheel 420 via a hub 426 which is secured to a drive hub 428 together with an axle shaft flange 430 by means of a plurality of bolts 432. Secured to a torque transmission shaft 434 is a small sprocket 436 as best seen in FIG. 26. The chain 422 drivingly connects the large and small sprockets 424 and 436.

Referring to FIG. 26, the torque transmission shaft 434 is rotatably supported by a bracket 436 via which the orbitroll 44 is securely connected to the mast 20. The torque transmission shaft 434 has one end having the small sprocket 436 and an opposite end a large gear 438 which meshes with a small gear 440 fixed to a drive shaft 444 of the orbitroll 44. In this driving connection, rotation of the road wheel 420 is transmitted to the orbitroll 44. In this embodiment, an electromagnetic clutch 62 operable under the control of a control unit 68B is disposed in the torque transmission shaft 434 as indicated in diagram in FIG. 26.

Figure 27:
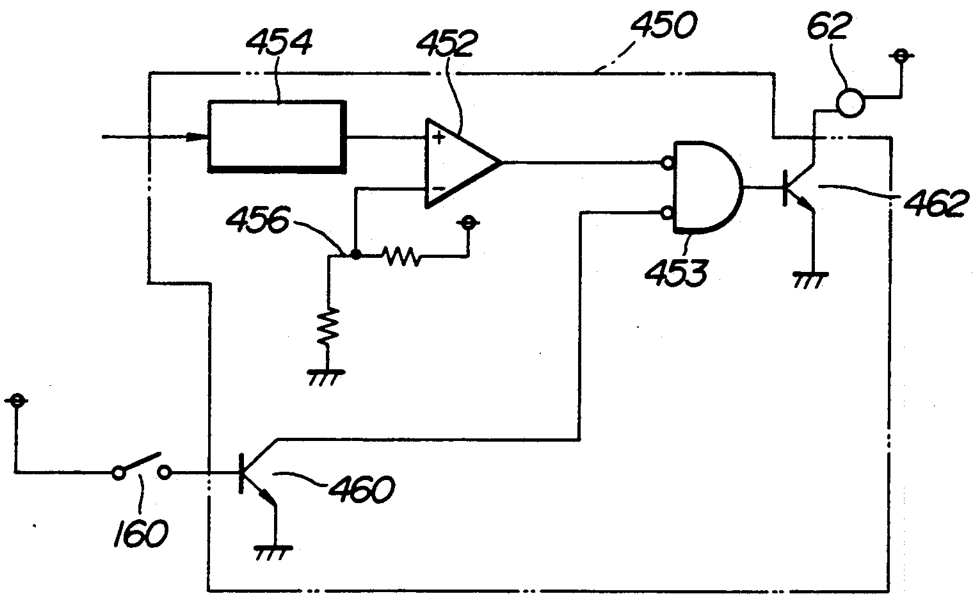
FIG. 27 is an electric circuit diagram.

FIG. 27 shows a control circuit 450 which is included in the control unit **68*c* (see FIG. 23). This circuit 450 includes a comparator 452 and a NAND circuit 454. A vehicle speed responsive pulse train signal is fed to a D/A converter 454 where D/A conversion is effected to produce an analog vehicle speed signal. This analog vehicle speed voltage signal is supplied to one terminal of the comparator 452. A comparison is made between this voltage signal with a reference voltage provided by a voltage divider 456. If the vehicle speed indicative voltage signal is greater than the reference voltage, a "H" level signal is supplied to the NAND circuit 453. To the NAND circuit 453 an output of the mode switch 160 is supplied via a transistor 460. The arrangement is such that when the manual mode switch 160 is manipulated and the "AUTOMATIC PUSH-PULL MODE" is selected, a "H" level signal is supplied to the NAND circuit 453. The output of the NAND circuit 453 is supplied to a transistor 462. This transistor 462 is rendered conductive when a "H" level signal is supplied thereto from the NAND circuit 453**.

From this circuit it will be appreciated that as long as the vehicle speed is higher than the reference value even if the operator inadvertenly set the mode switch to the "AUTOMATIC MODE" position, the NAND circuit 453 prevents the transistor 462 from becoming conductive.

Figure 28:
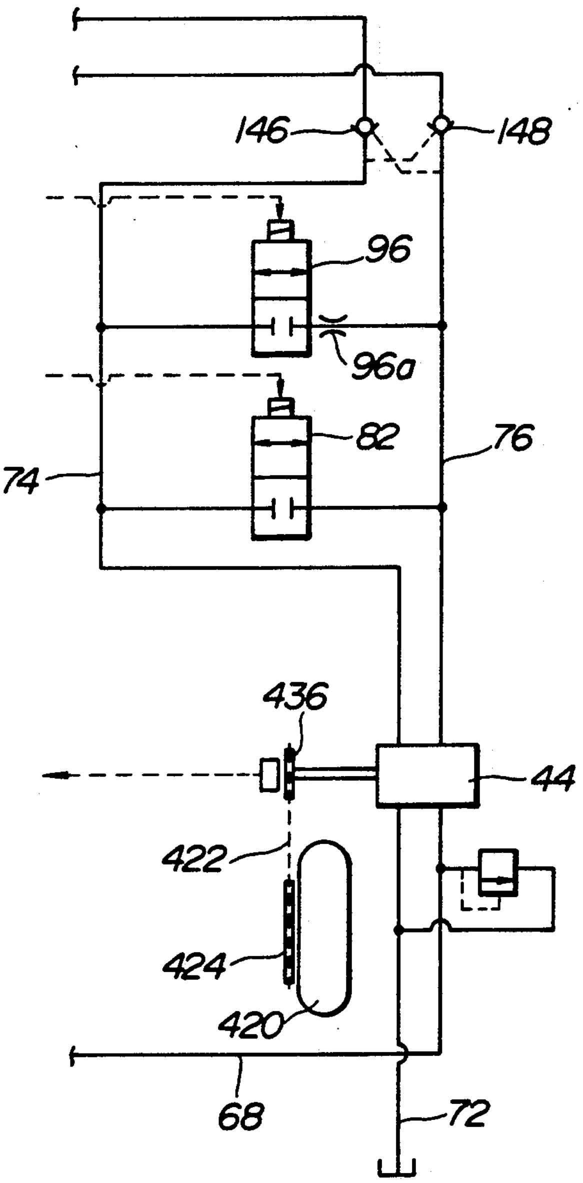
FIG. 28 is an alternate embodiment of FIG. 23.

FIG. 28 shows still another embodiment. This embodiment is different from the embodiment as shown in FIG. 23 in that instead of the electromagnetic clutch 62 has been replaced with an electromagnetically operated bypass valve 82.

Figure 29:
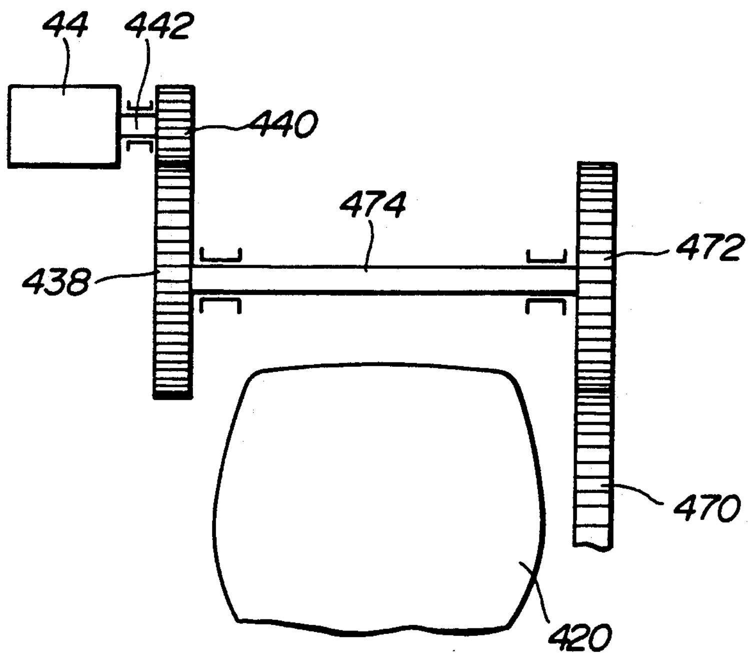
FIGS. 29–30 show two alternative examples of drive connections.

FIG. 29 shows another alternative embodiment of driving connection between a vehicle road wheel 420 and an orbitroll 44. In this case a large diameter gear 470 rotatable with the road wheel 420 meshes with a small gear 472 securely attached to one end of a torque transmission shaft 474 which has its opposite end fixedly supporting a gear 438 meshing with a gear 440 fixedly coupled with a drive shaft of an orbitroll 44.

Figure 30:
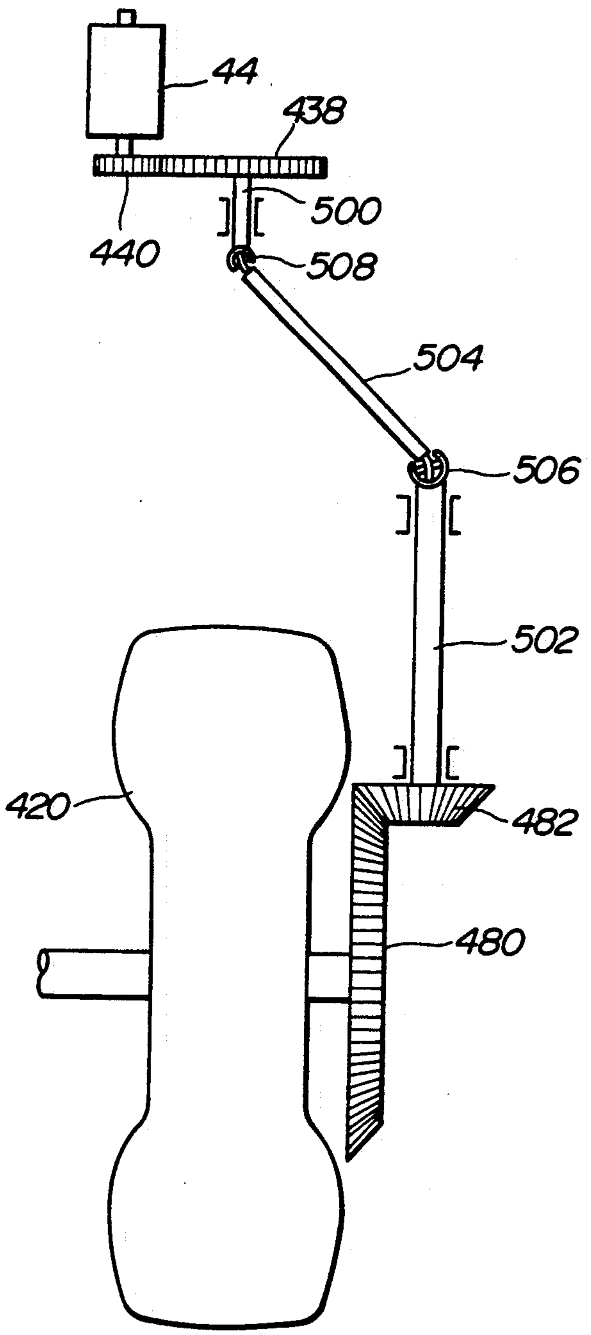

Lastly, as shown in FIG. 30, it is possible to use a pair of bevel gears 480 and 482. In this case the bevel gear 480 is fixedly mounted to the vehicle road wheel 420 for rotation therewith and the rotation of the small bevel gear 482 is transmitted to the torque transmission shaft 500 via two shafts 502 and 504 with two universal joints 506 and 508.

What is claimed is:

1. A lift vehicle comprising:

a roller;

means for rotating said roller at a rotation rate substantially proportional to a ground velocity at which said vehicle moves;

a hydraulic circuit including a hydraulic regulator for providing hydraulic fluid at a rate substantially proportional to said rotation rate at which said roller rotates, wherein said hydraulic regulator is mechanically connected to said roller and driven thereby; and a hydraulic actuator operated by said hydraulic fluid.

2. A lift vehicle as claimed in claim 1, wherein said roller is in rolling contact with the ground.

3. A lift vehicle as claimed in claim 1, wherein said roller is in contact with a tire of a road wheel of the vehicle.

4. A lift vehicle as claimed in claim 1, wherein said roller is drivingly connected to a vehicle road wheel.

5. A lift vehicle as claimed in claim 1, wherein said hydraulic circuit includes a bypass valve provided between said hydraulic regulator and said hydraulic actuator

6. A lift vehicle as claimed in claim 5, wherein said bypass path forms a return fluid line through which hydraulic fluid discharged by the hydraulic regulator passes.

7. A lift vehicle as claimed in claim 1, including a clutch which selectively interrupts a drive connection between said hydraulic regulator and said roller.

8. A lift vehicle as claimed in claim 1, wherein said hydraulic circuit includes parallel fluid lines by which said hydraulic regulator is connected to said hydraulic actuator.

9. A lift vehicle as claimed in claim 8, wherein said hydraulic circuit includes a valve which establishes a throttled fluid flow path interconnecting the parallel fluid lines.

10. A lift vehicle as claimed in claim 8, wherein said hydraulic circuit includes a valve which selectively establishes a position wherein one of the two parallel fluid lines is connected to a source of hydraulic fluid under pressure.

11. A lift vehicle as claimed in claim including a safeguard against inadvertent operation of said hydraulic actuator when the vehicle travels at speeds higher than a predetermined level.

12. A lift vehicle as claimed in claim 1, wherein said hydraulic actuator includes a push-pull mechanism and a gripper, and wherein said push-pull mechanism is operated by said hydraulic fluid from said hydraulic regulator, and said gripper is actuated by a second hydraulic fluid supplied on a different source of hydraulic fluid.

13. A lift vehicle as claimed in claim 1, wherein said hydraulic actuator includes a push-pull mechanism.

* * * * *